US012577399B2

(12) United States Patent
Sakai et al.

(10) Patent No.: US 12,577,399 B2
(45) Date of Patent: Mar. 17, 2026

(54) RESIN COMPOSITION, RESIN MOLDED ARTICLE AND METHOD FOR PRODUCING SAME

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP); Naoki Kaneko, Kanagawa (JP)

(73) Assignee: MITSUBISHI GAS CHEMICAL COMPANY, INC., Chiyoda-ku (JP)

(*) Notice: Subject to any disclaimer, the term of this patent is extended or adjusted under 35 U.S.C. 154(b) by 866 days.

(21) Appl. No.: 17/776,771

(22) PCT Filed: Nov. 17, 2020

(86) PCT No.: PCT/JP2020/042852
§ 371 (c)(1),
(2) Date: May 13, 2022

(87) PCT Pub. No.: WO2021/100716
PCT Pub. Date: May 27, 2021

(65) Prior Publication Data
US 2022/0403169 A1 Dec. 22, 2022

(30) Foreign Application Priority Data
Nov. 19, 2019 (JP) ................................ 2019-208941

(51) Int. Cl.

| | |
|---|---|
| ***C08L 79/08*** | (2006.01) |
| ***B29B 7/00*** | (2006.01) |
| ***B29K 79/00*** | (2006.01) |
| ***C08L 23/12*** | (2006.01) |
| ***C08L 63/00*** | (2006.01) |

(Continued)

(52) U.S. Cl.
CPC ............... *C08L 79/08* (2013.01); *C08L 23/12* (2013.01); *C08L 63/00* (2013.01); *C08L 67/02* (2013.01); *C08L 69/00* (2013.01); *C08L 77/04* (2013.01); *C08L 81/02* (2013.01); *B29B 7/007* (2013.01); *B29K 2079/08* (2013.01); *C08L 2205/14* (2013.01)

(58) Field of Classification Search
CPC ......... B29B 7/007; B29B 7/726; B29B 7/823; B29B 7/90; B29B 9/06; B29B 9/12; B29B 9/14; B29K 2079/08; C08G 63/183; C08G 63/199; C08G 73/1017; C08G 73/1042; C08G 73/1082; C08L 2205/14; C08L 23/12; C08L 23/14; C08L 23/24; C08L 33/24; C08L 63/00; C08L 63/08; C08L 67/02; C08L 69/00; C08L 77/02; C08L 77/04; C08L 79/08; C08L 81/02
See application file for complete search history.

(56) References Cited

U.S. PATENT DOCUMENTS

| | | | |
|---|---|---|---|
| 5,242,748 A | | 9/1993 | Folda et al. |
| 2016/0168329 A1 | | 6/2016 | Sato et al. |

(Continued)

FOREIGN PATENT DOCUMENTS

| | | |
|---|---|---|
| EP | 3 031 843 A1 | 6/2016 |
| JP | 02-199176 A | 8/1990 |

(Continued)

OTHER PUBLICATIONS

International Search Report issued Feb. 2, 2021 in PCT/JP2020/042852 filed on Nov. 17, 2020, 3 pages.

*Primary Examiner* — Ana L. Woodward
(74) *Attorney, Agent, or Firm* — Oblon, McClelland, Maier & Neustadt, L.L.P.

(57) ABSTRACT

A resin composition containing a polyimide resin particle (A) and at least one selected from the group consisting of a thermoplastic resin (B) and a thermosetting resin (C), wherein the polyimide resin particle (A) contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, and the polyimide resin particle (A) has a volume average particle size D50 of 5 to 200 μm.

($R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.)

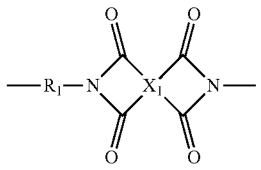

(1)

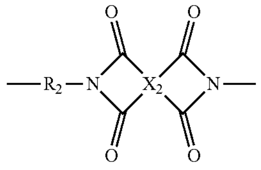

(2)

19 Claims, 1 Drawing Sheet

(51) Int. Cl.

| | |
|---|---|
| ***C08L 67/02*** | (2006.01) |
| ***C08L 69/00*** | (2006.01) |
| ***C08L 77/04*** | (2006.01) |
| ***C08L 81/02*** | (2006.01) |

(56) References Cited

U.S. PATENT DOCUMENTS

| | | | |
|---|---|---|---|
| 2017/0130003 | A1 | 5/2017 | Sato |
| 2017/0233620 | A1 | 8/2017 | Suzuki et al. |
| 2017/0275425 | A1 | 9/2017 | Sato |

FOREIGN PATENT DOCUMENTS

| | | | |
|---|---|---|---|
| JP | 02-206652 | A | 8/1990 |
| JP | 03-137153 | A | 6/1991 |
| JP | 04-277551 | A | 10/1992 |
| JP | 2004-051672 | A | 2/2004 |
| JP | 2005-028524 | A | 2/2005 |
| JP | 2017-210593 | A | 11/2017 |
| TW | 201433591 | A | 9/2014 |
| WO | WO 2013/118704 | A1 | 8/2013 |
| WO | WO 2016/147996 | A1 | 9/2016 |
| WO | WO 2016/147997 | A1 | 9/2016 |

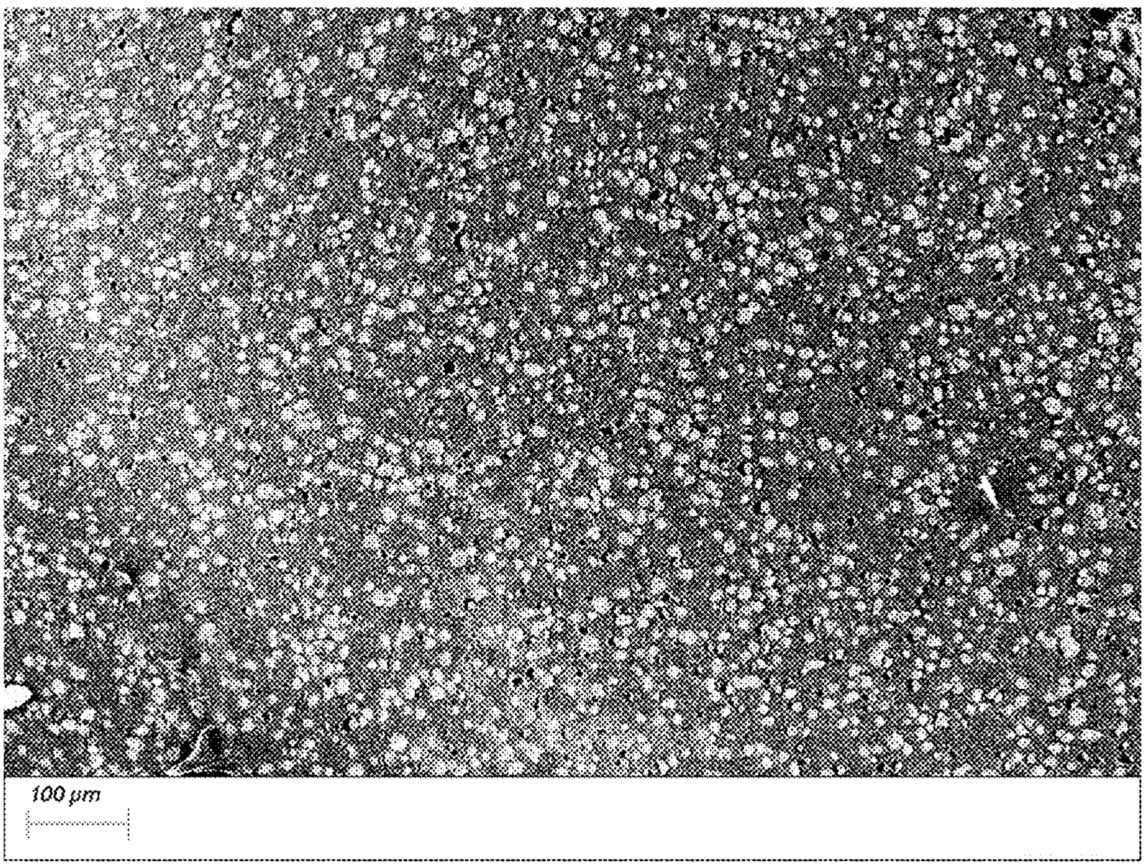
100 μm

RESIN COMPOSITION, RESIN MOLDED ARTICLE AND METHOD FOR PRODUCING SAME

CROSS-REFERENCE TO RELATED APPLICATIONS

The present application is a 35 U.S.C. § 371 national stage application of International patent application PCT/JP2020/042852, filed Nov. 17, 2020, which is based on and claims the benefit of priority to Japanese Application No. 2019-208941, filed Nov. 19, 2019. The entire contents of these applications are incorporated herein by reference.

TECHNICAL FIELD

The present invention relates to a resin composition, a resin molded article, and a method for producing the same. More specifically, the present invention relates to a resin composition and a resin molded article containing a thermoplastic polyimide resin particle and a thermoplastic resin or thermosetting resin, and a method for producing the same.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding processability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

For example, Patent Literature 2 discloses a thermoplastic polyimide resin containing a predetermined repeating structural unit obtained by reacting a tetracarboxylic acid and/or derivative thereof containing at least one aromatic ring, a diamine containing at least one alicyclic hydrocarbon structure, and a chain aliphatic diamine.

In the engineering plastics field, a technique of compounding and alloying two or more thermoplastic resins is also known for the purpose of improving physical properties, imparting functions according to the application, and the like. Patent Literature 3 discloses a thermoplastic polyimide resin containing a predetermined repeating unit, and also describes that this polyimide resin is used as a polymer alloy in combination with other resins.

CITATION LIST

Patent Literature

PTL 1: JP 2005-28524 A

PTL 2: WO 2013/118704

PTL 3: WO 2016/147996

SUMMARY OF INVENTION

Technical Problem

As described above, since crystalline thermoplastic polyimide resins have high heat resistance, strength, and chemical resistance, and have a lower specific gravity than metals, crystalline thermoplastic polyimide resins are also expected to be used as a resin modifier that can improve heat resistance, mechanical properties, and the like while maintaining a lightness derived from the resin material.

In the examples of Patent Literature 3, it is described that a crystalline thermoplastic polyimide resin containing a predetermined repeating unit and a polyether ether ketone resin (PEEK) were alloyed to produce a resin molded article. PEEK is a thermoplastic resin having high heat resistance similar to a polyimide resin, and a resin molded article is produced by heating and melting the crystalline thermoplastic polyimide resin containing a predetermined repeating unit and PEEK at a temperature equal to or higher than the melting point of the polyimide resin, then extruding and thermoforming.

On the other hand, such polyimide resins have not been used to study improving the properties of thermoplastic resin having lower heat resistance such as crystalline thermoplastic resins having a low melting point and amorphous thermoplastic resins having a low glass transition temperature, and of thermosetting resins.

In addition, a cured product of a thermosetting resin generally has higher heat resistance than a thermoplastic resin, but tends to have lower toughness because of a high crosslinking density. In aircraft, ships, and the like, factors related to fracture strength, such as strain energy release rate ($G_{1c}$), are emphasized as mechanical properties of the resin cured product, and it is desirable to improve $G_{1c}$ while maintaining the heat resistance of the resin cured product.

An object of the present invention is to, for a thermoplastic resin having low heat resistance or a thermosetting resin, provide a resin composition and a resin molded article having various improved properties, such as heat resistance and mechanical properties, while maintaining a lightness derived from the resin, and a method for producing the same.

Solution to Problem

The present inventors have found that, for a thermoplastic resin or a thermosetting resin, the aforementioned object can be attained by a resin composition containing a crystalline thermoplastic polyimide resin having a particular polyimide structural unit in a state in which the resin particle has a particle size in a particular range.

That is, the present invention provides the following [1] to [3].

[1] A resin composition containing a polyimide resin particle (A) and at least one selected from the group consisting of a thermoplastic resin (B) and a thermosetting resin (C), wherein the polyimide resin particle (A) contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, and the polyimide resin particle (A) has a volume average particle size D50 of 5 to 200 μm;

(1)

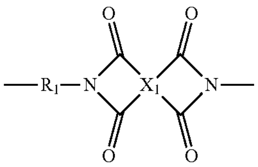

(2)

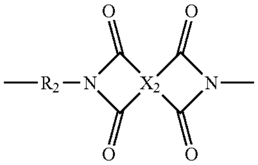

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

[2] A resin molded article containing a polyimide resin particle (A) and at least one selected from the group consisting of a cured product of a thermoplastic resin (B) and a thermosetting resin (C), wherein the polyimide resin particle (A) contains a repeating structural unit represented by the above formula (1) and a repeating structural unit represented by the above formula (2), a content ratio of the repeating structural unit of the formula (1) with respect to the total of the repeating structural unit of the formula (1) and the repeating structural unit of the formula (2) is 20 to 70 mol %, and the polyimide resin particle (A) has a volume average particle size D50 of 5 to 200 μm.

[3] A method for producing the resin molded article according to [2], including a step of molding a resin composition containing the polyimide resin particle (A) and at least one selected from the group consisting of the thermoplastic resin (B) and the thermosetting resin (C) at a temperature that is lower than the melting point of the polyimide resin particle (A).

Advantageous Effects of Invention

According to the present invention, for a thermoplastic resin such as a crystalline thermoplastic resin having a low melting point or an amorphous thermoplastic resin having a low glass transition temperature, or a thermosetting resin, a resin composition, a resin molded article having various improved properties, such as heat resistance and mechanical properties, while maintaining a lightness derived from the resin, and a method for producing the same, can be provided.

BRIEF DESCRIPTION OF DRAWING

FIG. 1 is a micrograph of when the resin composition (pellets) of Example 1 is observed by a field-emission scanning electron microscope (FE-SEM).

DESCRIPTION OF EMBODIMENTS

[Resin Composition]

The resin composition of the present invention contains: a polyimide resin particle (A) containing a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %, and the polyimide resin particle (A) having a volume average particle size D50 of 5 to 200 μm (hereinafter simply referred to as "polyimide resin particle (A)" or "component (A)"); and at least one selected from the group consisting of a thermoplastic resin (B) and a thermosetting resin (C).

(1)

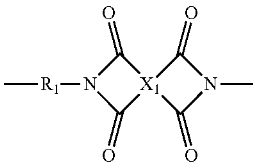

(2)

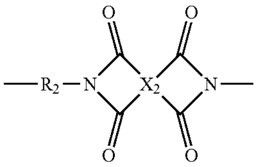

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The resin composition of the present invention contains a polyimide resin in which particular different polyimide structural units are combined at the particular ratio described above in a state of a particle having a predetermined D50. As a result, a resin composition and resin molded article having various improved properties, such as heat resistance and mechanical properties, while maintaining a lightness derived from the thermoplastic resin (B) or thermosetting resin (C), can be obtained.

Although the reason for this is not certain, it is thought that the polyimide resin particle (A) acts as a resin filler that is dispersed in the thermoplastic resin (B), thermosetting resin (C) or a cured product thereof, thereby improving various properties such as heat resistance and mechanical properties. In addition, since the polyimide resin particle (A) acts as a resin filler, an effect of improving slidability can also be expected.

The resin composition of the present invention is a thermoplastic resin composition or a thermosetting resin composition, and its form can be appropriately selected depending on whether the thermoplastic resin (B) or the thermosetting resin (C) is used. If the resin composition of the present invention is a thermoplastic resin composition containing the polyimide resin particle (A) and the thermoplastic resin (B), from the viewpoint of handleability and processability, the thermoplastic resin composition is preferably in the pellet form. More preferably, the thermoplastic resin composition is in pellet form in which the polyimide resin particle (A), which is described later, is dispersed in a matrix composed of the thermoplastic resin (B).

<Polyimide Resin Particle (A)>

From the viewpoint of improving various properties, such as heat resistance and mechanical properties, while maintaining a lightness derived from the thermoplastic resin (B) or thermosetting resin (C), the resin composition of the present invention contains a polyimide resin particle (A) containing a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %, and the polyimide resin particle (A) having a volume average particle size D50 of 5 to 200 μm.

(1)

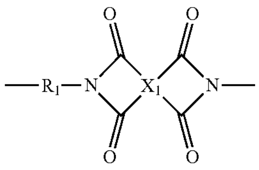

(2)

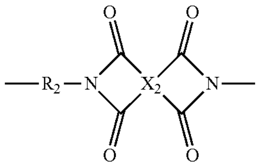

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The polyimide resin constituting the component (A) is a thermoplastic resin that is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The polyimide resin has crystallinity, and the degree of crystallinity can be determined by the exothermic amount (exothermic amount of crystallization) of the crystallization exothermic peak observed after the polyimide resin is melted and then cooled at a cooling rate of 20° C./min. The details of this will be described later.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

(R1-1)

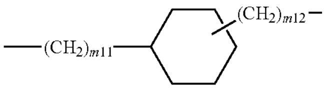

(R1-2)

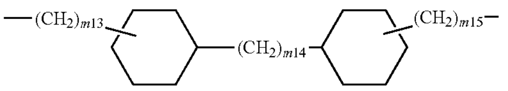

wherein mu and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

(R1-3)

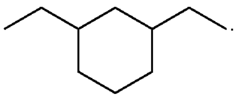

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

(X-1)

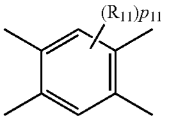

-continued (X-2)

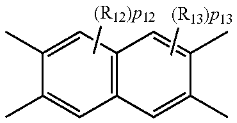

(X-3)

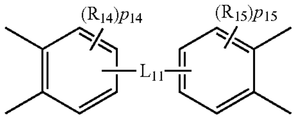

(X-4)

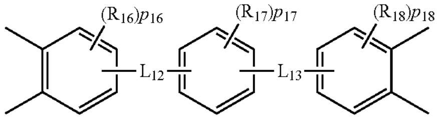

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 10 to 22 carbon atoms.

Similarly, $L_{11}$, $R_{14}$, $R_{15}$, $p_{14}$ and $p_{15}$ in the formula (X-3) are selected in such a manner that the tetravalent group represented by the formula (X-3) has from 12 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 18 to 22 carbon atoms.

$X_1$ is particularly preferably a tetravalent group represented by the following formula (X-5) or (X-6):

(X-5)

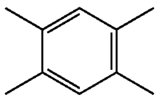

(X-6)

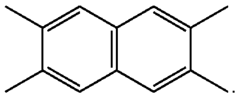

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

$$-(CH_2)_{m21}-O-(CH_2)_{m22}- \quad \text{(R2-1)}$$

$$-(CH_2)_{m23}-O-(CH_2)_{m24}-O-(CH_2)_{m25}- \quad \text{(R2-2)}$$

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is preferably 20 mol % to 70 mol %. In the case where the content ratio of the repeating structural unit of the formula (1) is in the above range, the polyimide resin may also be sufficiently crystallized in an ordinary injection molding cycle. When the content ratio is 20 mol % or more, molding processability is good, and when the content ratio is 70 mol % or less, good heat resistance can be maintained.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less from the viewpoint of exerting high crystallinity.

Among these, from the viewpoint of obtaining a resin composition having higher crystallinity and better heat resistance, the content ratio of the repeating structural unit of the formula (1) with respect to the total of the repeating structural unit of the formula (1) and the repeating structural unit of the formula (2) is preferably 20 mol % or more, and less than to 40 mol %. The content ratio described above is more preferably 25 mol % or more, further preferably 30 mol % or more, still further preferably 32 mol % or more from the viewpoint of molding processability, and is still further preferably 35 mol % or less from the viewpoint of exerting high crystallinity.

The content ratio of the total of the repeating structural unit of the formula (1) and the repeating structural unit of the formula (2) with respect to the total repeating structural units constituting the polyimide resin is preferably 50 to 100 mol %, more preferably 75 to 100 mol %, further preferably 80 to 100 mol %, and still further preferably 85 to 100 mol %.

The polyimide resin may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

(3)

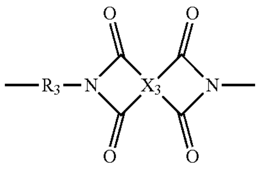

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., $-C(CF_3)_2-$ and $-(CF_2)_p-$ (wherein p is an integer of 1-10)), as well as $-CO-$, $-SO_2-$, $-SO-$, $-CONH-$, and $-COO-$.

$R_3$ is preferably a divalent group represented by the following formula (R3-1) or (R3-2):

(R3-1)

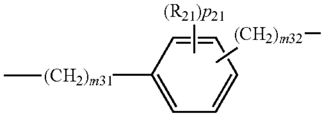

(R3-2)

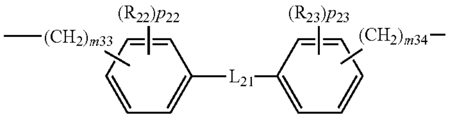

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The polyimide resin may further contain a repeating structural unit represented by the following formula (4):

(4)

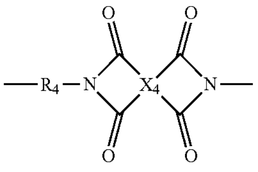

wherein $R_4$ represents a divalent group containing $-SO_2-$ or $-Si(R_x)(R_y)O-$; $R_x$ and $R_y$ each independently represent a chain aliphatic group having from 1 to 3 carbon atoms, or a phenyl group; and $X_4$ represents a tetravalent group having from 6 to 22 carbon atoms containing at least one aromatic ring.

$X_4$ is defined similarly to $X_1$ in the formula (1), and preferred embodiments thereof are also the same.

There is no particular limitation on the end structure of the polyimide resin. For example, the polyimide resin constituting the polyimide resin particle (A) may be a polyimide resin having uncapped ends. A polyimide resin having uncapped ends refers to a polyimide resin in which the end structures of the polyimide resin are only the end amino group and the end carboxy group derived from the tetracarboxylic acid component and the diamine component as the starting material.

When the polyimide resin constituting the polyimide resin particle (A) have uncapped ends, it is possible to crosslink the end amino group and the end carboxy group in the polyimide resin particle (A) with the thermoplastic resin (B) or thermosetting resin (C), which enables mechanical properties such as toughness to be further improved. From this point of view, in the resin composition of the present invention, it is more preferable to use a polyimide resin particle (A) composed of a polyimide resin having uncapped ends in combination with the thermosetting resin (C).

On the other hand, when the polyimide resin does have capped ends, the polyimide resin preferably has a chain aliphatic group having from 5 to 14 carbon atoms at an end.

The chain aliphatic group may be either saturated or unsaturated, and may be in the form of either linear or branched chain. When the polyimide resin contains the above particular group at the end thereof, it is possible to obtain a resin composition excellent in heat aging resistance.

Examples of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Examples of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms from the viewpoint of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

Further, when the polyimide resin has a chain aliphatic group having from 5 to 14 carbon atoms at an end, from the viewpoint of heat aging resistance, other than an end amino group and an end carboxy group, it is preferable to have only the chain aliphatic group having from 5 to 14 carbon atoms at an end. When a group, besides the above groups, is contained at the end, the content thereof with respect to the chain aliphatic group having from 5 to 14 carbon atoms is preferably 10 mol % or less and more preferably 5 mol % or less.

When the polyimide resin has a chain aliphatic group having from 5 to 14 carbon atoms at an end, the content of the chain aliphatic group having from 5 to 14 carbon atoms in the polyimide resin is preferably 0.01 mol % or more, more preferably 0.1 mol % or more, and further preferably 0.2 mol % or more based on the total 100 mol % of the total repeating structural units constituting the polyimide resin from the viewpoint of exerting excellent heat aging resistance. In order that a sufficient molecular weight is ensured and good mechanical properties are achieved, the content of the chain aliphatic group having from 5 to 14 carbon atoms in the polyimide resin is preferably 10 mol % or less, more preferably 6 mol % or less and further preferably 3.5 mol % or less based on the total 100 mol % of the total repeating structural units constituting the polyimide resin.

The content of the chain aliphatic group having from 5 to 14 carbon atoms in the polyimide resin can be determined by depolymerization of the polyimide resin.

The polyimide resin preferably has a melting point of 360° C. or less and a glass transition temperature of 150° C. or more.

The melting point of the polyimide resin is preferably 280° C. or more and more preferably 290° C. or more from the viewpoint of heat resistance, and is more preferably 345° C. or less, further preferably 340° C. or less, and still further preferably 335° C. or less from the viewpoint of exerting high molding processability.

In addition, the glass transition temperature of the polyimide resin is more preferably 160° C. or more and further preferably 170° C. or more from the viewpoint of heat resistance, and is preferably 250° C. or less, more preferably 230° C. or less, and further preferably 200° C. or less from the viewpoint of exerting high molding processability.

In addition, in the polyimide resin, the exothermic amount (hereinafter, also simply referred to as "exothermic amount of crystallization") of the crystallization exothermic peak observed in melting and then cooling of the polyimide resin at a cooling rate of 20° C./min with differential scanning calorimetric measurement is preferably 5.0 mJ/mg or more, more preferably 10.0 mJ/mg or more, and further preferably 17.0 mJ/mg or more from the viewpoint of enhancement of crystallinity, heat resistance, mechanical strength, and chemical resistance. The upper limit of the exothermic amount of crystallization is not particularly limited, and is usually 45.0 mJ/mg or less.

The melting point, the glass transition temperature, and the exothermic amount of crystallization of the polyimide resin can all be measured by a differential scanning calorimeter, and specifically by the methods described in the examples.

The logarithmic viscosity of the polyimide resin at 30° C. in a 5 mass % concentrated sulfuric acid solution is preferably 0.2 to 2.0 dL/g and more preferably 0.3 to 1.8 dL/g. When the logarithmic viscosity is 0.2 dL/g or more, a molded article formed of the resin composition obtained has sufficient mechanical strength, and when the logarithmic viscosity is 2.0 dL/g or less, molding processability and handleability are good. The logarithmic viscosity $\mu$ is obtained according to the following expression by measuring the elapsed times for flowing concentrated sulfuric acid and the polyimide resin solution at 30° C. with a Cannon-Fenske viscometer.

$$\mu=\ln(ts/t_0)/C$$

$t_0$: elapsed time for flowing concentrated sulfuric acid
ts: elapsed time for flowing polyimide resin solution
C: 0.5 (g/dL)

The weight average molecular weight Mw of the polyimide resin constituting the polyimide resin particle (A) is preferably in the range of 10,000 to 150,000, more preferably 15,000 to 100,000, further preferably 20,000 to 80,000, still further preferably 30,000 to 70,000, and still further preferably 35,000 to 65,000. Further, if the weight average molecular weight Mw of the polyimide resin is 10,000 or more, the mechanical strength of the obtained molded article is good, if it is 40,000 or more, the mechanical strength stability is good, and if it is 150,000 or less, the molding processability is good.

The weight average molecular weight Mw of the polyimide resin can be measured by a gel permeation chromatography (GPC) method using polymethyl methacrylate (PMMA) as a standard sample.

(Volume Average Particle Size D50)

The polyimide resin particle (A) has a volume average particle size D50 of, from the viewpoint of obtaining a resin composition and resin molded article having various improved properties, such as heat resistance and mechanical properties, while maintaining a lightness derived from the thermoplastic resin (B) or thermosetting resin (C), and the viewpoint of dispersibility, 5 to 200 μm, more preferably 5 to 150 μm, further preferably 5 to 100 μm, and still further preferably 5 to 40 μm.

The D50 of the polyimide resin particle (A) can be measured by a laser diffraction light scattering particle size distribution measuring instrument, and specifically by the method described in the examples.

The shape of the polyimide resin particle (A) is not particularly limited, but it is preferably porous. When the polyimide resin particle (A) is porous, it is possible to further reduce weight while improving various properties such as heat resistance and mechanical properties of the obtained resin composition and resin molded article. In addition, the resin composition and resin molded article can be expected to have, for example, a low dielectric constant. From the viewpoint of obtaining these effects, the polyimide resin particle (A) is preferably present in the resin composition and resin molded article in the state of a porous particle. Therefore, as will be described later, it is preferable to produce the resin composition and resin molded article without imparting a thermal history that is equal to or higher than the melting point of the polyimide resin particle (A). Further, “producing the resin composition and resin molded article without imparting a thermal history that is equal to or higher than the melting point of the polyimide resin particle (A)” means that all of the production steps in the production of the resin composition and resin molded article of the present invention are carried out under temperature conditions of lower than the melting point of the polyimide resin particle (A).

The fact that the polyimide resin particle (A) is porous can be confirmed by observing the particle with a scanning electron microscope (SEM).

Adjustment of the D50 of the polyimide resin particle (A) to the above range and making the polyimide resin particle (A) porous can be achieved by producing the polyimide resin particle (A) by the production method described later.

(Specific Gravity)

The specific gravity of the polyimide resin particle (A) is, from the viewpoint of obtaining a resin composition and resin molded article having various improved properties, such as heat resistance and mechanical properties, while maintaining a lightness derived from the thermoplastic resin (B) or thermosetting resin (C), preferably from 0.8 to 1.7, more preferably from 0.9 to 1.5, further preferably from 1.0 to 1.4, and still further preferably from 1.05 to 1.25.

The specific gravity of the polyimide resin particle (A) is a value measured at 23° C., and specifically can be measured by the method described in the examples.

(True Density)

The true density of the polyimide resin particle (A) measured by a gas phase method is, from the viewpoint of obtaining a resin composition and resin molded article having various improved properties, such as heat resistance and mechanical properties, while maintaining a lightness derived from the thermoplastic resin (B) or thermosetting resin (C), preferably from 1.0 to 1.8 g/cm$^3$, more preferably from 1.1 to 1.6 g/cm$^3$, and further preferably from 1.2 to 1.5 g/cm$^3$. Further, the true density of the polyimide resin particle (A) measured by a liquid phase method is, from the above viewpoint, preferably from 0.8 to 1.7 g/cm$^3$, more preferably from 0.9 to 1.5 g/cm$^3$, and further preferably from 1.0 to 1.4 g/cm$^3$.

True density measurement by the gas phase method can be performed in accordance with the “Measurement method of density and specific gravity by gas substitution method” specified in JIS Z8807: 2012. Further, true density measurement by the liquid phase method (pycnometer method) can be performed using a wet-type true density measuring instrument using n-butyl alcohol as the medium.

The true density measurement can be specifically performed by the method described in the examples.

In addition, a difference ($D_1$-$D_2$) between a true density $D_1$ of the polyimide resin particle (A) measured by the gas phase method and a true density $D_2$ of the polyimide resin particle (A) measured by the liquid phase method is preferably from 0.05 to 0.7 g/cm$^3$, more preferably from 0.08 to 0.5 g/cm$^3$, and further preferably from 0.08 to 0.4 g/cm$^3$. ($D_1$-$D_2$) is presumed to indicate the presence of fine pores that the medium used in true density measurement by the liquid phase method are unable to enter.

(Specific Surface Area)

The specific surface area of the polyimide resin particle (A) is, from the viewpoint of handleability and the viewpoint of obtaining a resin composition having excellent fluidity, preferably from 1.0 to 50 m$^2$/g, more preferably from 2.0 to 40 m$^2$/g, and further preferably from 5.0 to 25 m$^2$/g. It is presumed that both the D50 and the pore volume of the polyimide resin particle (A) affect the specific surface area.

The specific surface area can be calculated by the BET method, and specifically can be measured by the method described in the examples.

(Total Pore Volume)

When the polyimide resin particle (A) is porous, the total pore volume of the polyimide resin particle (A) is, from the viewpoint of obtaining a resin composition and resin molded article having various improved properties, such as heat resistance and mechanical properties, while maintaining a lightness derived from the thermoplastic resin (B) or thermosetting resin (C), preferably from 0.005 to 0.50 cc/g, more preferably from 0.01 to 0.30 cc/g, and further preferably from 0.015 to 0.20 cc/g.

The total pore volume specifically can be measured by the method described in the examples.

(Average Pore Diameter)

When the polyimide resin particle (A) is porous, the average pore diameter of the polyimide resin particle (A) is, from the viewpoint of obtaining a resin composition and resin molded article having various improved properties, such as heat resistance and mechanical properties, while maintaining a lightness derived from the thermoplastic resin (B) or thermosetting resin (C), preferably from 5 to 85 nm, more preferably from 10 to 80 nm, and further preferably from 20 to 70 nm.

The average pore diameter specifically can be measured by the method described in the examples.

The values of D50, specific gravity, true density, specific surface area, total pore volume, and average pore diameter of the polyimide resin particle (A) measured using the polyimide resin particle (A) before blending into the resin composition and resin molded article are preferably in the above range. In the present invention, when producing a resin composition and a resin molded article without imparting a heat history that is equal to or higher than the melting point of the polyimide resin particle (A), as long as there is no deformation due to shear stress, it is considered that the shape of the polyimide resin particle (A) to be used is maintained for the shape of the polyimide resin particle (A) in the resin composition and resin molded article. The "shape of the polyimide resin particle (A) to be used" means the D50 and porous state of the polyimide resin particle (A) before blending into the resin composition and resin molded article.

(Method for Producing Polyimide Resin Particle (A))

The polyimide resin particle (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the polyimide resin particle (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is more preferably 25 mol % or more, further preferably 30 mol % or more, still further preferably 32 mol % or more, and is more preferably 60 mol % or less, further preferably 50 mol % or less, still further preferably less than 40 mol, and still further preferably 35 mol % or less from the viewpoint of exerting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less.

The molar ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

In addition, the molar ratio is preferably 12 mol % or less, more preferably 10 mol % or less, further preferably 5 mol % or less and still more preferably 0 mol % from the viewpoint of a decrease in coloration of the polyimide resin particle (A).

In the production of the polyimide resin particle (A), the charged amount ratio of the tetracarboxylic acid component and the diamine component is preferably from 0.9 to 1.1 mol of the diamine component per 1 mol of the tetracarboxylic acid component.

In the production of the polyimide resin particle (A), an end capping agent may be mixed in addition to the tetracarboxylic acid component and the diamine component. The end capping agent is preferably at least one selected from the group consisting of a monoamine compound and a dicarboxylic acid compound. When an end capping agent is used, the amount used may be an amount that can introduce a desired amount of end groups into the polyimide resin constituting the polyimide resin particle (A). This used amount is, based on one mole of the tetracarboxylic acid and/or derivative thereof, preferably from 0.0001 to 0.1 moles, more preferably from 0.001 to 0.06 moles, further preferably from 0.002 to 0.035 moles, still further preferably from 0.002 to 0.020 moles, and even still further preferably from 0.002 to 0.012 moles.

Among them, monoamine end capping agents are preferable as the end capping agent, and from the viewpoint of introducing the above-described chain aliphatic group having 5 to 14 carbon atoms at an end of the polyimide resin constituting the polyimide resin particle (A) to improve heat aging resistance, a monoamine that has a chain aliphatic group having 5 to 14 carbon atoms is more preferable, and a monoamine that has a saturated linear aliphatic group having 5 to 14 carbon atoms is further preferable.

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

A known polymerization method may be applied as the polymerization method for producing the polyimide resin particle (A). Examples thereof include, but are not particularly limited to, solution polymerization, melt polymerization, solid phase polymerization, suspension polymerization, and the like. Among these, suspension polymerization under high temperature conditions using an organic solvent is particularly preferable. When performing suspension polymerization under high temperature conditions, it is preferable to perform polymerization at 150° C. or higher, and it is more preferable to perform at 180 to 250° C. The polymerization time can be appropriately selected according to the monomer used, but about 0.1 to 6 hours is preferable.

The method for producing the polyimide resin particle (A) preferably includes a step of reacting the tetracarboxylic acid component and the diamine component in the presence of a solvent containing an alkylene glycol solvent represented by the following formula (I). By doing so, D50 is 5 to 200 μm, and a porous polyimide resin particle can be easily obtained.

$$Ra_1—O—(Ra_2—O)_n—H \quad (I)$$

wherein $Ra_1$ represents a hydrogen atom or an alkyl group having from 1 to 4 carbon atoms, $Ra_2$ represents a linear alkylene group having from 2 to 6 carbon atoms, and n represents an integer of from 1 to 3.

$Ra_1$ in the formula (I) represents a hydrogen atom or an alkyl group having from 1 to 4 carbon atoms, preferably an alkyl group having from 1 to 4 carbon atoms, and more preferably a methyl group or an ethyl group.

$Ra_2$ in the formula (I) represents a linear alkylene group having from 2 to 6 carbon atoms, preferably a linear alkylene group having from 2 to 3 carbon atoms, more preferably an ethylene group.

In the formula (I), n represents an integer of from 1 to 3, and preferably 2 or 3.

Specific examples of the alkylene glycol solvent include ethylene glycol monomethyl ether, diethylene glycol monomethyl ether (also known as 2-(2-methoxyethoxy) ethanol), triethylene glycol monomethyl ether, ethylene glycol monoethyl ether, diethylene glycol monoethyl ether (also known as 2-(2-ethoxyethoxy) ethanol), ethylene glycol monoisopropyl ether, diethylene glycol monoisopropyl ether, triethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, ethylene glycol monoisobutyl ether, ethylene glycol, 1,3-propanediol, and the like. These solvents may be used alone, or two or more solvents selected from these may be used in combination. Of these solvents, at least one selected from the group consisting of 2-(2-methoxyethoxy)ethanol, triethylene glycol monomethyl ether, 2-(2-ethoxyethoxy)ethanol, and 1,3-propanediol is preferable.

An example of a suitable method for producing the polyimide resin particle (A) is a method in which a solution (a) containing a tetracarboxylic acid component in a solvent containing the alkylene glycol solvent and a solution (b) containing a diamine component in a solvent containing the alkylene glycol solvent are prepared separately, the solution (b) is then added to the solution (a) or the solution (a) is then added to the solution (b) to prepare a solution (c) containing a polyamide acid, and then by heating the solution (c), the polyamide acid is imidized, and the polyimide resin particle is precipitated in the solution (c) to obtain polyimide resin particle (A).

The reaction between the tetracarboxylic acid component and the diamine component can be performed under normal pressure or under pressure, but it is preferable to perform the reaction under normal pressure in terms of the point that a pressure-resistant container is not required.

When an end capping agent is used, it is more preferable to mix the solution (a) and the solution (b), mix the end capping agent into the resultant mixture to prepare the solution (c) containing a polyamide acid, and then heat the solution (c), and it is more preferable to add the solution (b) to the solution (a), then add the end capping agent after addition of the solution (b) is finished to prepare the solution (c) containing a polyamide acid, and then heat the solution (c).

<Thermoplastic Resin (B)>

The thermoplastic resin (B) (hereinafter also referred to as "component (B)") is a thermoplastic resin other than the component (A).

When producing a resin composition and a resin molded article without imparting on the polyimide resin particle (A) a heat history that is equal to or higher than the melting point, as long as there is no deformation due to shear stress, the polyimide resin particle (A) can be contained in the resin composition and resin molded article in a state in which the shape of the polyimide resin particle (A) to be used is maintained. From this point of view, the thermoplastic resin (B) is preferably at least one selected from the group consisting of the following (B1) and (B2).

(B1) An amorphous thermoplastic resin having a glass transition temperature that is lower than the melting point of the polyimide resin particle (A).

(B2) A crystalline thermoplastic resin having a melting point that is lower than the melting point of the polyimide resin particle (A) or having a glass transition temperature that is lower than the glass transition temperature of the polyimide resin particle (A).

In the present specification, "amorphous thermoplastic resin" refers to a thermoplastic resin having a glass transition temperature but does not have a melting point. In more detail, a "thermoplastic resin that does not have a melting point" refers to a thermoplastic resin that has an exothermic amount (exothermic amount of crystallization) of the crystallization exothermic peak observed in melting and then cooling of the resin at a cooling rate of 20° C./min with differential scanning calorimetric measurement of less than 5 mJ/mg. Further, "crystalline thermoplastic resin" refers to a thermoplastic resin that has a melting point and that has an exothermic amount of crystallization of 5 mJ/mg or more.

(Amorphous Thermoplastic Resin (B1))

When the thermoplastic resin (B) is an amorphous thermoplastic resin, the thermoplastic resin (B) is preferably an amorphous thermoplastic resin (B1) (hereinafter referred to as "amorphous thermoplastic resin (B1)" or "component (B1)") having a glass transition temperature that is lower than the melting point of the polyimide resin particle (A). Since the component (B1) can be melted and molded at a temperature that is lower than the melting point of the component (A), a resin composition and resin molded article containing the component (A) can be obtained in a state in which the shape of the component (A) to be used is maintained.

Examples of the component (B1) include amorphous thermoplastic resins having a glass transition temperature that is lower than the melting point of the component (A), such as a polystyrene resin; polyvinyl chloride; polyvinylidene chloride; polymethyl methacrylate; an acrylonitrile-butadiene-styrene resin; a polycarbonate resin; a polysulfone resin; a polyphenyl sulfone resin; a polyarylate resin; a polyphenylene ether resin; a polyether sulfone resin; a polyetherimide resin; a polyamideimide resin; and a polyurethane resin. These can be used alone or in combination of two or more.

From the viewpoint of making it easier to contain the component (A) in the resin composition and resin molded article while maintaining the shape of the component (A) to be used, when the melting point of the component (A) is taken to be $Tm_A$ (° C.), the glass transition temperature $Tg_{B1}$ (° C.) of the component (B1) is preferably ($Tm_A$−30°) C. or lower, more preferably ($Tm_A$−50°) C. or lower, and further preferably ($Tm_A$−100°) C. or lower. The lower limit value of the glass transition temperature $Tg_{B1}$ is not particularly limited, and for example it may be −125° C. or higher. From the viewpoint of heat resistance, $Tg_{B1}$ is preferably −50° C. or higher, more preferably 0° C. or higher, and further preferably 50° C. or higher.

(Crystalline Thermoplastic Resin (B2))

When the thermoplastic resin (B) is a crystalline thermoplastic resin, the thermoplastic resin (B) is preferably a crystalline thermoplastic resin (B2) (hereinafter referred to as "crystalline thermoplastic resin (B2)" or "component (B2)") having a melting point that is lower than the melting point of the polyimide resin particle (A), or having a glass transition temperature that is lower than the glass transition temperature of the polyimide resin particle (A). Since the component (B2) also can be melted and molded at a temperature that is lower than the melting point or a temperature that is lower than the glass transition temperature of the component (A), the component (A) can be contained in the resin composition and resin molded article in a state in which the shape of the component (A) to be used is maintained.

Examples of the component (B2) include crystalline thermoplastic resins having a glass transition temperature that is lower than the glass transition temperature of the component (A) or having a melting point that is lower than the melting point of the component (A), for example a polyolefin resin such as polyethylene, polypropylene, and a cyclic polyolefin; a polyamide resin; a polyacetal resin; a polyphenylene sulfide resin; a polyester resin such as polyethylene terephthalate, polyethylene naphthalate, polycyclohexylenedimethylene terephthalate, and polyglycolic acid; a liquid crystal polymer; a fluororesin such as polytetrafluoroethylene and polyvinylidene fluoride; a polymethylpentene resin; and a polyurethane resin. These can be used alone or in combination of two or more.

The melting point $Tm_{B2}$ (° C.) of the component (B2) is not particularly limited as long as it is lower than the melting point of the component (A), but from the viewpoint of formability, the melting point $Tm_{B2}$ is preferably 320° C. or lower, more preferably 300° C. or lower, further preferably 280° C. or lower, and still further preferably 250° C. or lower. The lower limit value of the melting point $Tm_{B2}$ is not particularly limited, but from the viewpoint of heat resistance, it is preferably 50° C. or higher, more preferably 100° C. or higher, further preferably 120° C. or higher, and still further preferably 140° C. or higher.

Further, the glass transition temperature $Tg_{B2}$ (° C.) of the component (B2) is not particularly limited as long as it is lower than the glass transition temperature of the component (A), but from the viewpoint of formability, the glass transition temperature $Tg_{B2}$ is preferably 170° C. or lower, more preferably 150° C. or lower, further preferably 120° C. or lower, and still further preferably 100° C. or lower. The lower limit value of the glass transition temperature $Tg_{B2}$ is not particularly limited, and may be, for example, −125° C. or higher. From the viewpoint of heat resistance, $Tg_{B2}$ is preferably −50° C. or higher, more preferably −20° C. or higher, and further preferably 0° C. or higher.

As the thermoplastic resin (B) used in the present invention, one or more selected from the group consisting of components (B1) and (B2) can be used.

From the viewpoint of containing the component (A) in the resin composition and resin molded article while maintaining the shape of the component (A) to be used, and from the viewpoint of improving heat resistance, mechanical properties, and the like, the thermoplastic resin (B) preferably is at least one selected from the group consisting of a polystyrene resin, polyvinyl chloride, polyvinylidene chloride, polymethyl methacrylate, an acrylonitrile-butadiene-styrene resin, a polycarbonate resin, a polysulfone resin, a polyphenyl sulfone resin, a polyarylate resin, a polyphenylene ether resin, a polyether sulfone resin, a polyetherimide resin, a polyamideimide resin, a polyolefin resin, a polyamide resin, a polyacetal resin, a polyphenylene sulfide resin, a polyester resin, a liquid crystal polymer, a fluororesin, a polymethylpentene resin, and a polyurethane resin, more preferably is at least one selected from the group consisting of a polystyrene resin, polyvinyl chloride, polyvinylidene chloride, polymethyl methacrylate, an acrylonitrile-butadiene-styrene resin, a polycarbonate resin, a polyphenyl sulfone resin, a polyphenylene ether resin, a polyether sulfone resin, a polyetherimide resin, a polyamideimide resin, a polyolefin resin, a polyamide resin, a polyacetal resin, a polyphenylene sulfide resin, a polyester resin, a fluororesin, and a polyurethane resin, further preferably is at least one selected from the group consisting of a polycarbonate resin, a polyolefin resin, a polyamide resin, and a polyphenylene sulfide resin, still further preferably is a polyolefin resin, and even still further preferably is a polypropylene resin.

Further, the polyimide resin particle (A) may have the end amino group described above, and when a thermoplastic resin (B) having a structure that can react with the end amino group is used, the toughness of the obtained resin composition and resin molded article can be improved. From this viewpoint, at least one thermoplastic resin (B) selected from the group consisting of a polyamide resin and a polyamide imide resin is preferable, and a polyamide resin is more preferable.

As used herein, improvement in toughness means that the elongation until break when a tensile stress is applied to the resin molded article increases, and this can be evaluated by, for example, measuring the tensile fracture strain.

Examples of the polyamide resin used as the thermoplastic resin (B) include an aromatic ring-containing polyamide and an aliphatic polyamide.

As the aromatic ring-containing polyamide, from the viewpoint of satisfying the requirements of the component (B2), a polyamide derived from an aromatic ring-containing diamine and an aliphatic dicarboxylic acid is preferable. Examples thereof include poly meta-xylylene adipamide (MXD6), poly meta-xylylene sebacamide (MXD10), poly para-xylylene adipamide (PXD6), poly para-xylylene sebacamide (PXD10), poly meta/para-xylylene adipamide (MPXD6), and poly meta/para-xylylene sebacamide (MPXD10), and one or more of these can be used.

Examples of the aliphatic polyamide include polycaproamide (polyamide 6), polyhexamethylene adipamide (polyamide 66), polyundecamide (polyamide 11), polydodecanamide (polyamide 12), and polyhexamethylenedodecamide (polyamide 612), and one or more of these can be used.

Among these, an aliphatic polyamide is more preferable from the viewpoint of obtaining an effect of an improvement in toughness in the obtained resin composition and resin molded article.

<Thermosetting Resin (C)>

Th thermosetting resin (C) (hereinafter also referred to as "component (C)") is not particularly limited as long as it is a thermosetting resin that can disperse the polyimide resin particle (A). Examples thereof include at least one selected from the group consisting of an epoxy resin, a phenol resin, a urea resin, a melamine resin, an unsaturated polyimide resin, a bismaleimide resin, a silicone resin, a urethane resin, a casein resin, a furan resin, an alkyd resin, and a xylene resin. Among these, from the viewpoint of containing the component (A) in the resin composition and resin molded article while maintaining the shape of the component (A) to be used, and from the viewpoint of dispersibility of the component (A), component (C) is preferably at least one selected from a group consisting of an epoxy resin, a urethane resin, and a bismaleimide resin, more preferably at least one selected from the group consisting of an epoxy resin and a urethane resin, and further preferably is an epoxy resin.

Examples of the epoxy resin used as the component (C) include a two-component curable epoxy resin composition containing an epoxy group-containing compound as the main agent and a curing agent.

The epoxy group-containing compound that is the main agent is preferably a polyfunctional epoxy compound having two or more epoxy groups. From the viewpoint of the mechanical strength of the cured product, it is more preferable that the polyfunctional epoxy compound is a polyfunctional epoxy compound containing an aromatic ring or an alicyclic structure in the molecule.

Specific examples of the polyfunctional epoxy compound include a polyfunctional epoxy compound having a glycidyl amino group derived from a meta-xylylenediamine; a polyfunctional epoxy compound having a glycidyl amino group derived from a para-xylylenediamine; a polyfunctional epoxy compound having a glycidyl amino group derived from 1,3-bis(aminomethyl)cyclohexane; a polyfunctional epoxy compound having a glycidyl amino group derived from 1,4-bis(aminomethyl)cyclohexane; a polyfunctional epoxy compound having a glycidyl amino group derived from a diaminodiphenylmethane, such as tetraglycidyl diaminodiphenylmethane; a polyfunctional epoxy compound having a glycidyl amino group and/or glycidyloxy group derived from a para-aminophenol; a polyfunctional epoxy compound having a glycidyloxy group derived from a bisphenol A, such as bisphenol A diglycidyl ether; a polyfunctional epoxy compound having a glycidyloxy group derived from a bisphenol F, such as bisphenol F diglycidyl ether; a polyfunctional epoxy compound having a glycidyloxy group derived from a phenol novolac; and a polyfunctional epoxy compound having a glycidyloxy group derived from a resorcinol. The polyfunctional epoxy compound can also be used in by mixing two or more types together.

Of these, from the viewpoint of obtaining a cured product having high heat resistance, the polyfunctional epoxy compound used as the main agent preferably has as a main component at least one selected from the group consisting of a polyfunctional epoxy compound having a glycidyl amino group derived from a meta-xylylenediamine, a polyfunctional epoxy compound having a glycidyl amino group derived from a para-xylylenediamine, a polyfunctional epoxy compound having a glycidyl amino group derived from a diaminodiphenylmethane, a polyfunctional epoxy compound having a glycidyloxy group derived from a bisphenol A, and a polyfunctional epoxy compound having a glycidyloxy group derived from a bisphenol F, and from the viewpoint of obtaining a cured product having high heat resistance and the viewpoints of availability and economic efficiency, a polyfunctional epoxy compound having a glycidyl amino group derived from a diaminodiphenylmethane, such as tetraglycidyl diaminodiphenylmethane, is more preferable.

The curing agent used in the epoxy resin composition may have two or more active hydrogens that can react with the epoxy group in the main agent, and from the viewpoint of curability, a polyamine compound or a modified product thereof is preferable.

Specifically, examples include a chain aliphatic polyamine compound such as ethylenediamine, diethylenetriamine, triethylenetetramine, tetraethylenepentamine, pentaethylenehexamine, hexamethylenediamine, 2-methylpentamethylenediamine, and trimethylhexamethylenediamine; a polyamine compound having an alicyclic structure such as 1,2-bis(aminomethyl)cyclohexane, 1,3-bis(aminomethyl)cyclohexane, 1,4-bis(aminomethyl)cyclohexane, menthenediamine, isophoronediamine, norbornanediamine, tricyclodecandiamine, adamantanediamine, diaminocyclohexane, 1,4-diamino-2-methylcyclohexane, 1,4-diamino-3,6-diethylcyclohexane, diaminodiethylmethylcyclohexane, 3,3'-dimethyl-4,4'-diaminodicyclohexylmethane, and 4,4'-diaminodicyclohexylmethane; a polyamine compound having an aromatic rings such as o-xylylenediamine, m-xylylenediamine (MXDA), p-xylylenediamine (PXDA), phenylenediamine, diaminodiphenylmethane, and diaminodiphenylsulfone; a polyamine compound having a complex cyclic structure such as N-aminomethyl piperadine and N-aminoethyl piperazine; a polyetherpolyamine compound, and a Mannich modified product, epoxy modified product, Michael adduct, Michael addition/polycondensation product, styrene modified product, polyamide modified product and the like thereof. These can be used alone or in combination of two or more.

Among these, from the viewpoint of obtaining a resin composition and resin molded article having high heat resistance and high fracture strength, the epoxy resin used as the component (C) is more preferably a two-component curable epoxy resin composition having tetraglycidyl diaminodiphenylmethane as a main agent and diaminodiphenylsulfone as a curing agent. This is because the cured product of the resin composition containing the polyimide resin particle (A) and the epoxy resin composition as the thermosetting resin (C) has excellent heat resistance, a better strain energy release rate ($G_{1c}$, and can exhibit a high fracture strength.

The strain energy release rate ($G_{1c}$ is a value calculated from plane strain fracture toughness ($K_{1C}$) in accordance with ASTM D5045-99, and can be specifically obtained by the method described in the examples.

The content of the curing agent in the epoxy resin composition is an amount such that a ratio of the number of active amine hydrogens in the curing agent and the number of epoxy groups in the main agent (number of active amine hydrogens in the curing agent/number of epoxy groups in the main agent) is preferably from 1/0.5 to 1/2, more preferably from 1/0.6 to 1/1.8, further preferably from 1/0.75 to 1/1.5.

Examples of the urethane resin used as the component (C) include a two-component curable urethane resin composition containing a polyol compound, such as a polyester polyol or a polyether polyol, and a polyisocyanate compound.

Examples of the bismaleimide resin used as the component (C) include a two-component curable bismaleimide resin composition containing a bismaleimide, such as 4,4'-bis(maleimide)diphenylmethane, and a cyanate compound, such as bis(3,5-dimethyl-4-cyanatephenyl)methane.

(Content)

It is sufficient for the resin composition of the present invention to contain the polyimide resin particle (A) and at least one selected from the group consisting of the thermoplastic resin (B) and the thermosetting resin (C). The thermoplastic resin (B) and the thermosetting resin (C) can be used in combination.

The mass ratio of the polyimide resin particle (A) to the total amount of the thermoplastic resin (B) and thermosetting resin (C), [(A)/{(B)+(C)}], is, from the viewpoint of improving various properties, such as heat resistance and mechanical properties, while maintaining a lightness derived from the thermoplastic resin (B) and thermosetting resin (C), preferably in the range of 1/99 to 99/1, more preferably 5/95 to 95/5, and further preferably 5/95 to 90/10.

From the viewpoint of obtaining a resin composition or resin molded article in which the polyimide resin particle (A) is dispersed in a matrix composed of the thermoplastic resin (B), thermosetting resin (C), or a cured product thereof, the mass ratio [(A)/{(B)+(C)}] is more preferably in the range of 5/95 to 80/20, further preferably 5/95 to 70/30, still further preferably 5/95 to 60/40, even still further preferably 5/95 to 50/50, and even still further preferably 5/95 to 40/60.

When the resin composition of the present invention is a thermoplastic resin composition containing the polyimide resin particle (A) and the thermoplastic resin (B), the mass ratio is preferably in the range of 5/95 to 60/40, and furthermore preferably 5/95 to 50/50, because strand extrudability from the extruder is good, and pellets can be easily produced.

Further, from the viewpoint of obtaining the effects of the present invention, the total content of the polyimide resin particle (A), the thermoplastic resin (B), and the thermosetting resin (C) in the resin composition is preferably 70% by mass or more, more preferably 80% by mass or more, and further preferably 90% by mass or more. The upper limit is 100% by mass.

<Additives>

The resin composition of the present invention may contain additives such as a filler, a delusterant, a nucleating agent, a plasticizer, an antistatic agent, an anti-coloring agent, an anti-gelling agent, a flame retardant, a colorant, a slidability improver, an antioxidant, a conducting agent, and a resin-modifying agent, as necessary The content of the additive is not particularly limited, but from the viewpoint that the effect of the additive is exerted while maintaining the physical properties derived from the component (A), the component (B), and the component (C), the content is usually 50% by mass or less, preferably from 0.0001 to 30% by mass, more preferably from 0.0001 to 15% by mass, further preferably from 0.001 to 10% by mass, and still further preferably from 0.01 to 8% by mass in the resin composition.

[Method for Producing Resin Composition]

The method for producing the resin composition of the present invention is not particularly limited, but from the viewpoint of containing the polyimide resin particle (A) in the resin composition while maintaining the shape of the polyimide resin particle (A) to be used, it is preferable to produce the resin composition by mixing the polyimide resin particle (A) with the thermoplastic resin (B) or thermosetting resin (C), without imparting a thermal history that is equal to or higher than the melting point of the polyimide resin particle (A). As described above, "produce the resin composition without imparting a thermal history that is equal to or higher than the melting point of the polyimide resin particle (A)" means that all of the production steps in the production of the resin composition of the present invention are carried out under temperature conditions of lower than the melting point of the polyimide resin particle (A).

Specifically, when the resin composition of the present invention is a thermoplastic composition containing the polyimide resin particle (A) and the thermoplastic resin (B), in the production of the resin composition, it is preferable to knead the polyimide resin particle (A) and the thermoplastic resin (B) at a temperature less the melting point of the polyimide resin particle (A). For example, in an extruder, a resin composition containing the polyimide resin particle (A) and the thermoplastic resin (B) is kneaded at a set temperature that is lower than the melting point of the polyimide resin particle (A). When the set temperature of the extruder consists of multiple stages, it is preferable that all the set temperatures are lower than the melting point of the polyimide resin particle (A). Further, in the kneading step of the resin composition, it is preferable to adjust so that the resin temperature does not become a temperature equal to or higher than the melting point of the polyimide particle resin (A).

From the viewpoint of maintaining the shape of the component (A) to be used, the kneading temperature is, when the melting point of the component (A) is taken to be $Tm_A$ (° C.), preferably a temperature of ($Tm_A$−10°) C. or lower, more preferably a temperature of ($Tm_A$−20°) C. or lower, and further preferably a temperature of ($Tm_A$−30°) C. or lower.

Further, when the thermoplastic resin (B) is the amorphous thermoplastic resin (B1), this kneading temperature is preferably a temperature equal to or higher than the glass transition temperature of the amorphous thermoplastic resin (B1). When the glass transition temperature of the component (B1) is taken to be $Tg_{B1}$ (° C.), this kneading temperature is, from the viewpoint of ease of extrusion, more preferably ($Tg_{B1}$+5°) C. or higher, and further preferably ($Tg_{B1}$+10°) C. or higher. When the thermoplastic resin (B) is the crystalline thermoplastic resin (B2), the kneading temperature is preferably a temperature equal to or higher than the melting point of the crystalline thermoplastic resin (B2). When the melting point of the component (B2) is taken to be $Tg_{B2}$ (° C.), the kneading temperature is, from the viewpoint of ease of extrusion, more preferably ($Tg_{B2}$+5°) C. or higher, and further preferably ($Tg_{B2}$+10°) C. or higher.

Preferably, pellets of the thermoplastic resin composition having the polyimide resin particle (A) while maintaining the shape of the polyimide resin particle (A) to be used can be produced by kneading the resin composition under the above-described temperature conditions and then extruding the strand.

After producing the pellets, a step of drying may be performed as necessary, but the drying temperature at this time is preferably lower than the melting point of the polyimide resin particle (A).

When the resin composition of the present invention is a thermosetting resin composition containing the polyimide resin particle (A) and the thermosetting resin (C), in the production of the resin composition, the polyimide resin (A) may be mixed with the thermosetting resin (C) under temperature conditions lower than the melting point of the polyimide resin particle (A). From the viewpoint of maintaining the shape of the component (A) to be used and from the viewpoint of suppressing decomposition before curing of the thermosetting resin (C), the mixing temperature is, when the melting point of the component (A) is taken to be $Tm_A$ (° C.), preferably a temperature of ($Tm_A$−10°) C. or lower, more preferably a temperature of ($Tm_A$−20°) C. or lower, further preferably a temperature of ($Tm_A$−30°) C. or lower, still further preferably a temperature of ($Tm_A$−50°) C. or lower, even still further preferably a temperature of ($Tm_A$−100°) C. or lower, and even still further preferably a temperature of ($Tm_A$−120°) C. or lower. The lower limit of the mixing temperature can be selected according to the curing rate and the like of the thermosetting resin composition.

In the production of the resin composition of the present invention, when the melting point of the component (A) is taken to be $Tm_A$ (° C.), from the viewpoint of maintaining the shape of the component (A) to be used, it is more preferable to perform all the production steps under temperature conditions of ($Tm_A$−10°) C. or lower, more preferably ($Tm_A$−20°) C. or lower, and further preferably ($Tm_A$−30°) C. or lower.

[Resin Molded Article]

The resin molded article of the present invention contains a polyimide resin particle (A) and at least one selected from the group consisting of a cured product of a thermoplastic resin (B) and a thermosetting resin (C), wherein the polyimide resin particle (A) contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, and the polyimide resin particle (A) has a volume average particle size D50 of 5 to 200 μm.

(1)

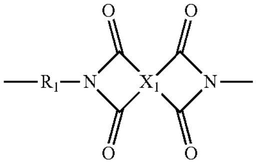

(2)

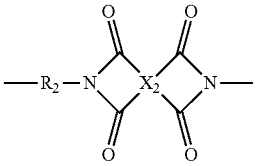

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The component (A), the component (B), and the component (C), as well as the preferred forms thereof, are the same as described for the resin composition.

The resin molded article of the present invention is preferably a resin molded article in which the polyimide resin particle (A) is dispersed in a matrix composed of the thermoplastic resin (B) or a cured product of the thermosetting resin (C). As a result, it is considered that the polyimide resin particle (A) acts as a resin filler, and that an effect of an improvement in various properties such as heat resistance and mechanical properties is obtained.

[Method for Producing Resin Molded Article]

In the method for producing the resin molded article of the present invention, from the viewpoint of containing the polyimide resin particle (A) in the resin molded article while maintaining the shape of the polyimide resin (A) to be used, it is preferable to produce the resin molded article without imparting a thermal history that is equal to or higher than the melting point of the polyimide resin particle (A). From this viewpoint, the method for producing the resin molded article of the present invention preferably includes a step of molding a resin composition containing the polyimide resin particle (A) and at least one selected from the group consisting of the thermoplastic resin (B) and the thermosetting resin (C) at a temperature that is lower than the melting point of the polyimide resin particle (A).

In the production of the resin molded article, the above-described resin composition of the present invention can be used.

When producing the resin molded article using a thermoplastic resin composition containing the polyimide resin particle (A) and the thermoplastic resin (B), it is preferable to use pellets of the resin composition produced by the method described above.

Before the pellets is subjected to molding, a step of drying the pellet may be performed as necessary. From the viewpoint of containing the polyimide resin particle (A) in the resin molded article while maintaining the shape of the polyimide resin particle (A) to be used, the drying temperature of the pellets is preferably lower than the melting point of polyimide resin particle (A), and from the viewpoint of preventing deterioration of the thermoplastic resin (B), the drying temperature is more preferably 200° C. or lower, further preferably 150° C. or lower, and still further preferably 120° C. or lower. The lower limit value of the drying temperature is not particularly limited, but from the viewpoint of drying efficiency, it is preferably 40° C. or higher, and more preferably 60° C. or higher.

The drying time of the pellets can be appropriately selected according to the type of the thermoplastic resin (B) to be used, the drying temperature, and the like, but is preferably from 0.5 to 10 hours, and more preferably from 2 to 8 hours.

When a thermoplastic resin composition containing the polyimide resin particle (A) and the thermoplastic resin (B) is used as the resin composition, examples of the method for molding the resin molded article include injection-molding, extrusion molding, blow molding, heat press molding, vacuum molding, pneumatic molding, laser molding, ultrasonic heating molding, welding, heat adhesion, and the like. Among these, injection-molding is preferable because molding can be performed without setting the molding temperature or the temperature of the mold at the time of molding to a high temperature.

When a thermoplastic resin composition containing the polyimide resin particle (A) and the thermoplastic resin (B) is used as the resin composition, the thermoplastic resin (B) is preferably at least one selected from the group consisting of the following (B1) and (B2).

(B1) An amorphous thermoplastic resin having a glass transition temperature that is lower than the melting point of the polyimide resin particle (A)

(B2) A crystalline thermoplastic resin having a melting point that is lower than the melting point of the polyimide resin particle (A) or having a glass transition temperature that is lower than the glass transition temperature of the polyimide resin particle (A)

The amorphous thermoplastic resin (B1) and crystalline thermoplastic resin (B2), and the preferred forms thereof, are the same as described for the resin composition.

When the thermoplastic resin (B) is the amorphous thermoplastic resin (B1), from the viewpoint of maintaining the shape of the polyimide resin particle (A) to be used, the method for producing the resin molded article preferably includes a step of extruding the resin composition containing the polyimide resin particle (A) and the amorphous thermoplastic resin (B1) at a temperature that is lower than the melting point of the polyimide resin particle (A) and that is equal to or higher than the glass transition temperature of the amorphous thermoplastic resin (B1).

From the viewpoint of maintaining the shape of the component (A) to be used, this temperature is, when the melting point of the component (A) is taken to be $Tm_A$ (° C.), preferably ($Tm_A$−10°) C. or lower, more preferably ($Tm_A$−20°) C. or lower, and further preferably ($Tm_A$−30°) C. or lower. The lower limit value of this temperature is not particularly limited as long as the temperature is equal to or higher than the glass transition temperature of the component (B1), but when the glass transition temperature of the component (B1) is taken to be to $Tg_{B1}$ (° C.), this temperature is preferably ($Tm_{B1}$+5°) C. or higher, and more preferably ($Tm_{B1}$+10°) C. or higher.

In the production of the resin molded article, it is preferable to set the set temperature at least at the time of extrusion to the above-described range, and when the set temperature consists of multiple stages, it is preferable that all the set temperatures are in the above-described range. Further, it is more preferable to adjust the resin temperature at the time of extrusion to be within the above-described range.

Further, when the thermoplastic resin (B) is the crystalline thermoplastic resin (B2), from the viewpoint of maintaining the shape of the polyimide resin particle (A) to be used, the method for producing the resin molded article preferably includes a step of extruding the resin composition containing the polyimide resin particle (A) and the crystalline thermoplastic resin (B2) at a temperature that is lower than the melting point of the polyimide resin particle (A) and that is equal to or higher than the melting point of the crystalline thermoplastic resin (B2).

From the viewpoint of maintaining the shape of the component (A) to be used, this temperature is, when the melting point of the component (A) is taken to be $Tm_A$ (° C.), preferably ($Tm_A$−10°) C. or lower, more preferably ($Tm_A$−20°) C. or lower, and further preferably ($Tm_A$−30°) C. or lower. The lower limit value of this temperature is not particularly limited as long as the temperature is equal to or higher than the melting point of the component (B2), but from the viewpoint of ease of extrusion, when the melting point of the component (B2) is taken to be $Tm_{B2}$ (° C.), preferably ($Tm_{B2}$+5°) C. or higher, and more preferably ($Tm_{B2}$+10°) C. or higher.

As described above, in the production of the resin molded article, it is preferable to set the set temperature at least at the time of extrusion to the above-described range, and when the set temperature consists of multiple stages, it is preferable that all the set temperatures are in the above-described range. Further, it is more preferable to adjust the resin temperature at the time of extrusion to be within the above-described range.

When a thermoplastic resin composition containing the polyimide resin particle (A) and the thermoplastic resin (B) is used as the resin composition, the specific procedures in the method for producing the resin molded article of the present invention are, for example, as follows.

First, the polyimide resin particle (A), the thermoplastic resin (B), and various optional components are added and dry blended as necessary, the resultant mixture is then introduced into the extruder, and kneaded and extruded at a temperature that is lower than the melting point of the polyimide particle resin (A), preferably a temperature in the range described above, to produce pellets. Alternatively, the thermoplastic resin (B) may be introduced into the extruder, melted at a temperature that is lower than the melting point of polyimide resin particle (A), preferably at a temperature in the range described above, the polyimide particle resin (A) and various optional components may be introduced as necessary, and the resultant mixture kneaded and extruded in the extruder to produce the pellets.

A resin molded article having a desired shape can be produced by drying the pellets under the above-described drying conditions as necessary, then introducing the pellets into a molding machine, such as an injection-molding machine, and molded at a temperature that is lower than the melting point of the polyimide resin particle (A). After molding, the resin molded article may be subjected to postprocessing step of melting and bonding the interface between the component (A) and the component (B) by, for example, heating for a short time by ultrasonic waves as necessary.

When a thermosetting resin composition containing the polyimide resin particle (A) and the thermosetting resin (C) is used as the resin composition, from the viewpoint of maintaining the shape of the component (A) to be used, the method for producing the resin molded article cures and molds the resin composition at a temperature that is lower than the melting point of the polyimide resin particle (A), and preferably at a temperature in the range described above. From the viewpoint of maintaining the shape of the component (A) to be used and from the viewpoint of suppressing decomposition before curing of the thermosetting resin (C), this temperature (curing temperature) is, when the melting point of the component (A) is taken to be $Tm_A$ (° C.), preferably ($Tm_A$−10°) C. or lower, more preferably ($Tm_A$−20°) C. or lower, further preferably ($Tm_A$−30°) C. or lower, still further preferably ($Tm_A$−50°) C. or lower, and even still further preferably ($Tm_A$−100°) C. or lower. The lower limit of this temperature is not particularly limited as long as it is a temperature that can cure the thermosetting resin composition.

<Applications>

The resin composition and resin molded article of the present invention have various improved properties, such as heat resistance and mechanical properties, while maintaining a lightness derived from the resin, and can be applied to, for example, industrial intermediate products such as prepregs, resin binders, a matrix resin for fiber-reinforced plastics (FRP), coating agents, laminated adhesives, and materials for 3D printers; and to various formed articles such as sliding members, structural members or engine members for aircraft, ships, and vehicles, cooking utensils, stationery, earphone diaphragms, air pillows, and fasteners.

When the resin composition of the present invention is used for a structural member for an aircraft, a ship, or a vehicle, from the viewpoint of improving elastic modulus, strength, and toughness, the material constituting the structural member is preferably a fiber-reinforced composite material containing the resin composition of the present invention or a cured product thereof, and reinforcing fiber.

Examples of the reinforcing fiber used for the fiber-reinforced composite material include glass fiber, carbon fiber, boron fiber, metal fiber, and the like, one or two or more of these can be used. Among these, carbon fiber is preferable from the viewpoint of the strength and lightness of the obtained composite material. That is, the fiber-reinforced composite material is preferably a carbon-fiber-reinforced composite material (CFRP) containing the resin composition or a cured product thereof and carbon fiber.

The carbon fiber used for the CFRP can be produced from rayon, polyacrylonitrile (PAN), or the like as a starting material, or can be produced by spinning a pitch of petroleum, coal, or the like as a starting material. In addition, a recycled product that reuses the end material of the carbon fiber or a recycled product obtained by removing the resin from the CFRP can also be used. Examples of the form of the carbon fiber include various forms, such as forms in which monofilaments or multifilaments are simply arranged to intersect in one direction or alternately, fabrics such as woven fabrics, nonwoven fabrics or mats. Among these, carbon fiber in the form of monofilaments, fabric, nonwoven fabric, or a mat is preferable, and in the form of fabric is more preferable.

The average fiber diameter of the carbon fiber is preferably 1 to 100 μm, more preferably 3 to 50 μm, and further preferably 4 to 20 μm. When the average fiber diameter is in this range, processing is easy, and the elastic modulus and strength of the obtained CRFP are excellent. The average fiber diameter can be measured by observing with a scanning electron microscope (SEM) or the like. This is carried out by randomly selecting 50 or more fibers, measuring the lengths, and calculating the number-average average fiber diameter.

The fineness of the carbon fiber is preferably 20 to 4,500 tex, and more preferably 50 to 4,000 tex. When the fineness is in this range, impregnation of the resin composition is easy, and the elastic modulus and strength of the obtained composite material are excellent. The fineness can be calculated by determining the weight of a long fiber of any length and converting into a weight per 1,000 m. It is preferable to use carbon fiber having a number of filaments of, usually, about 500 to 60,000.

The fiber-reinforced composite material can be produced by impregnating the resin composition of the present invention into the reinforcing fiber by a conventional method and then molding it into the desired shape.

EXAMPLES

The present invention will be described in more detail with reference to examples below, but the present invention is not limited thereto. Further, various measurements and evaluations in each Production Example and Example were carried out in the following manner.

<Infrared Spectroscopy (IR Measurement)>

The IR measurement of the polyimide resin particle was performed with "JIR-WINSPEC 50", produced by JEOL, Ltd.

<Logarithmic Viscosity μ>

The polyimide resin particle was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity μ was obtained according to the following expression.

$$\mu=\ln(ts/t_0)/C$$

$t_0$: elapsed time for flowing concentrated sulfuric acid ts: elapsed time for flowing polyimide resin solution C: 0.5 g/dL <Melting Point, Glass Transition Temperature, Crystallization Temperature, and Exothermic Amount of Crystallization>

The melting point Tm and glass transition temperature Tg of the polyimide resin particle and thermoplastic resins described in the production examples, the crystallization temperature Tc of the polyimide resin particle described in the production examples, and the exothermic amount of crystallization ΔHm were measured with a differential scanning calorimeter ("DSC-6220", produced by SII Nanotechnology, Inc.).

The polyimide resin particle or thermoplastic resin was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point Tm was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.

<Crystallization Half-Time>

The crystallization half-time of the polyimide resin particle was measured with a differential scanning calorimeter ("DSC-6220", produced by SII Nanotechnology, Inc.).

The polyimide resin was held at 420° C. for 10 minutes in a nitrogen atmosphere so as to completely melt, then quenched at a cooling rate of 70° C./min, and the time required from the appearance of the observed crystallization peak to the peak top thereof was calculated. In Table 1, cases where the crystallization half-time was 20 seconds or less are indicated as "<20".

<Weight Average Molecular Weight>

The weight average molecular weight (Mw) of the polyimide resin particle was measured with a gel permeation chromatography (GPC) measurement apparatus "Shodex GPC-101" produced by Showa Denko K.K. under the following conditions:

Column: Shodex HFIP-806M

Mobile phase solvent: HFIP containing 2 mM sodium trifluoroacetate

Column temperature: 40° C.

Flow rate of mobile phase: 1.0 mL/min

Specimen concentration: about 0.1 mass %

Detector: IR detector

Amount of injection: 100 μm

Calibration curve: standard PMMA

<Volume Average Particle Size (D50)>

The D50 of the polyimide resin particles and of the resin particles used in the comparative examples was determined by a laser diffraction particle size distribution measurement.

A laser diffraction light scattering particle size distribution measuring instrument "LMS-2000e" produced by Malvern was used as the measuring instrument. In the D50 measurement of the resin particles, the measurement was performed using water as a dispersion medium, and the resin particles were sufficiently dispersed under ultrasonic conditions. The measurement range was from 0.02 to 2000 μm.

<True Density (Gas Phase Method)>

True density measurement of the polyimide resin particles by the gas phase method was performed in accordance with the "Measurement method of density and specific gravity by gas substitution method" specified in JIS Z8807: 2012, using a "VM-100" produced by Seishin Co., Ltd., as the measuring instrument and helium gas as the gas.

<True Density (Liquid Phase Method)>

True density measurement of the polyimide resin particles by the liquid phase method (pycnometer method) was performed using an automatic wet true density measuring instrument "AUTO TRUE DENSER MAT-7000" produced by Seishin Co., Ltd., and n-butyl alcohol as the medium, and the true density was calculated from the following formula.

$$Pd = \frac{Wb - Wa}{(Wb - Wa) + (Wd - Wc)} \times Ld$$

Pd: True density of the sample

Wa: Measurement cell mass

Wb: (measurement cell+sample) mass

Wc: (measurement cell+sample+medium) mass

Wd: (measurement cell+medium) mass

Ld: Density of medium

<Specific Surface Area>

The specific surface area of the polyimide resin particles was determined by the BET method by measuring a nitrogen adsorption amount under the following conditions, and calculating from the obtained adsorption isotherm (vertical axis: nitrogen adsorption amount, horizontal axis: relative pressure P/P0). The measurement sample was pretreated by vacuum degassing for 6 hours under 180° C. heating.

Measuring instrument: 4-unit specific surface area and pore distribution measuring instrument, NOVA-TOUCH type, produced by Quantachrome Gas used: Nitrogen gas Refrigerant: Liquid nitrogen (temperature 77.35 K)

Measurement relative pressure: $5\times10^{3}<P/P_0<0.99$

Isotherm data used to calculate specific surface area: $0.05<P/P_0<0.3$

<Total Pore Volume>

The total pore volume of the polyimide resin particles was determined from the amount of adsorbed nitrogen at $P/P_{0,max}$ in the adsorption isotherm based on the premise that the pores were filled with liquid nitrogen.

<Average Pore Diameter>

The average pore diameter of the polyimide resin particles was calculated from the following equation.

$$\text{Average pore diameter } D_{ave}=(V_{total}/S)$$

$V_{total}$: Total pore volume

S: Specific surface area (BET method)

<Strand State>

The thermoplastic resin compositions of Examples 1 to 3 were visually observed and evaluated according to the following criteria.

A: Good

B: Strand could be extruded, but was brittle and easily broke

C: Strand could not be extruded

<Specific Gravity>

A molded article of 80 mm×10 mm×thickness 4 mm was produced by the method described later from the thermoplastic resin (B) alone used in Examples 1 to 3 or the thermoplastic resin composition obtained in Examples 1 to 3, and the specific gravity at 23° C. was determined by an electron hydrometer ("MDS-300", produced by Alfa Mirage Co., Ltd.).

In this embodiment, the specific gravity of the polyimide resin particle (A) was the absolute value of the true density (liquid phase method) measured by the method. The specific gravity of the polyimide resin particle 1 obtained in Production Example 1 was 1.19.

The specific gravity of the pellets obtained by melt-kneading the polyimide resin particle 1 obtained in Production Example 1 at a temperature equal to or higher than the melting point was measured by the following method.

The polyimide resin particle 1 obtained in Production Example 1 was melt-kneaded at a cylinder set temperature of 350° C. and screw rotation speed of 70 rpm using a Labo Plasto Mill (produced by Toyo Seiki Seisaku-Sho, Ltd.). A strand was extruded, cooled in air and then pelletized with a pelletizer ("Fan Cutter FC-Mini-4/N", produced by Hoshi Plastic Co., Ltd.). The obtained pellets were dried at 150° C. for 12 hours. The true density (liquid phase method) was then measured by the method described above, and measured value was taken as the specific gravity. This specific gravity was 1.29.

<Specific Gravity of Component (A) in Resin Molded Article>

The specific gravity of the component (A) in the resin molded articles obtained in Examples 1 to 3 was calculated from the following equation.

[(Specific gravity of resin molded article)−(specific gravity of component (*B*))×(mass fraction of component (*B*))]/(mass fraction of component (*A*))

<Tensile Strength, Tensile Modulus, and Tensile Fracture Strain>

Using the thermoplastic resin (B) alone used in each of the examples or the thermoplastic resin composition obtained in each of the examples, 1A-type test pieces specified in JIS K7161-2: 2014 were produced and used for measurement by the methods described later. Using a tensile tester (Strograph VG-1E, produced by Toyo Seiki Co., Ltd.), a tensile test was performed at a temperature of 23° C., a distance between grips of 50 mm, and a test speed of 20 mm/min in accordance with JIS K7161-1: 2014 and K7161-2: 2014, and the tensile strength, tensile modulus, and tensile fracture strain were measured.

<Flexural Modulus>

Using the thermoplastic resin (B) alone used in each of the examples or the thermoplastic resin composition obtained in each of the examples, molded articles of 80 mm×10 mm×thickness 4 mm defined in ISO 316 were produced and used for measurement by the methods described later. Using a bendograph (produced by Toyo Seiki Seisaku-Sho, Ltd.), a bending test was performed at a temperature of 23° C. and a test speed of 2 mm/min in accordance with ISO 178, and the flexural modulus was measured.

<Heat Deformation Temperature (HDT)>

Using the thermoplastic resin (B) alone used in each of the examples or the thermoplastic resin composition obtained in each of the examples, resin molded articles of 80 mm×10 mm×thickness 4 mm were produced and used for measurement by the methods described later.

For the measurement, a flatwise test was performed in accordance with JIS K7191-1, 2: 2015. Specifically, the heat deformation temperature was measured at distance between fulcrums of 64 mm, a load of 1.80 MPa, and a heating rate of 120° C./hour using an HDT test instrument "Auto-HDT3D-2" (produced by Toyo Seiki Seisaku-Sho, Ltd.).

<Weight Loss Temperature>

Measurement was performed using the thermoplastic resin (B) alone used in each of the examples, or a cured product of pellets of the thermoplastic resin composition or the thermosetting resin composition obtained in each of the examples.

For the measurement, a thermogravimetric analyzer ("TG/DTA6200" produced by Seiko Instruments Co., Ltd.) was used. About 10 mg of the sample was collected, and the temperature was increased from room temperature to 450° C. at a nitrogen gas flow rate of 100 mL/min and a heating rate of 10° C./min. With respect to 100% by mass of the sample weight at 100° C., the temperature at which the weight was reduced by 1% by mass was taken as the 1% weight loss temperature, the temperature at which the weight was reduced by 5% by mass was taken as the 5% weight loss temperature, and the temperature at which the weight was reduced by 10% by mass was taken as the 10% weight loss temperature.

<Dynamic Friction Coefficient>

Using the thermoplastic resin (B) alone used in each of the examples or the thermoplastic resin composition obtained in each of the examples, resin molded articles were produced by the method described later, machined into test pieces of 30 mm×30 mm×thickness 3 mm to be used for measurement.

For the measurement, a friction wear tester (MODEL EMF-III-F) produced by A&D Co., Ltd. was used. A sliding wear test was performed at 23° C. and 50% R.H. in accordance with JIS K7218(1986)—A method using a S45C ring (contact area 2 $cm^2$) as an opposing material at an initial load of 50 N, a test speed of 0.5 m/s, and a sliding distance of 3 km, and the dynamic friction coefficient was measured.

<Plane Strain Fracture Toughness ($K_{1C}$), Poisson's Ratio, and Strain Energy Release Rate ($G_{1c}$)>

The plane strain fracture toughness $K_{1C}$ was measured by the following "bending fracture toughness test", and Poisson's ratio and the tensile modulus were measured by the following "tensile test".

(Bending Fracture Toughness Test)

Using the cured product of the thermosetting resin compositions listed in Table 7, resin molded articles of 60 mm×12 mm×thickness 6 mm were produced by the method described later. After notching with a 30° t 1.0-isometric milling blade, pre-cracking was carried out, and the obtained test pieces were used for measurement.

For the measurement, a universal material testing machine (Model 5966) produced by Instron was used. The bending fracture toughness test (n=5) was performed in accordance with ASTM D5045-99 in a 23° C. environment at a test speed of 1 mm/min, a distance between fulcrums of 48 mm (initial).

(Tensile Test)

Using a cured product of the thermosetting resin compositions listed in Table 7, resin molded articles were produced by the method described later, and test pieces obtained by machining to 150 mm×12 mm×thickness 3 mm were used for measurement.

For the measurement, a universal material testing machine (Model 5966) produced by Instron was used. A tensile test (n=3) was performed in accordance with JIS K7161-2: 2014 at a temperature of 23° C., a distance between chucks of 115 mm, and a test speed of 1 mm/min. Strain was measured by attaching a single-axis strain gauge ("KFGS-5-120-C1-23", produced by Kyowa Electronic Instruments Co., Ltd.) at the center of one side of the test piece.

Next, a stress diffusion coefficient $K_Q$ was obtained from the following equation.

$$K_Q = \left(\frac{P_Q}{BW^{1/2}}\right) f(x)$$

$$f(x) = 6x^{1/2}\frac{\left[1.99 - x(1-x)\left(2.15 - 3.93x + 2.7x^2\right)\right]}{(1+2x)(1-x)^{3/2}}$$

$K_Q$: Stress diffusion coefficient (MPa, $m^{1/2}$)

$P_Q$: Load with respect to $K_Q$ (kN)

B: Test piece thickness (cm)

W: Test piece width (cm)

a: Crack length x: a/W

Further, S is the distance between fulcrums (cm), and S/W=4.

Here, when the following equation (1) is satisfied, $K_Q$ was calculated using $P_Q$.

$$P_{max}/P_Q<1.1 \quad (1)$$

$P_{max}$: Maximum load

In addition, when the conditions of the following (2) are satisfied, $K_Q=K_{1C}$.

$$B,a,W-a>2.5(K_Q/\sigma_y)^2 \quad (2)$$

$\sigma_y$: Bending offset 0.2% stress (MPa)

The strain energy release rate ($G_{1c}$) was calculated from the $K_{1C}$, Poisson's ratio, and tensile modulus obtained by the above method based on the following equation.

$$G_{1c}=\frac{(1-\nu^2)K_{1c}^2}{E}\times 10^6$$

$G_{1c}$: Strain energy release rate (J/$m^2$)

ν: Poisson's ratio

E: Tensile modulus (MPa)

<Glass Transition Temperature (Tg)>

The Tg of the cured product of the thermosetting resin compositions listed in Table 7 was determined by dynamic viscoelastic measurement (DMA). Using the thermosetting resin compositions listed in Table 7, resin molded articles of 50 mm×10 mm×thickness 3 mm were produced and used for measurement by the methods described later.

For the measurement, a dynamic viscoelastic measuring instrument ("EXSTAR DMS6100", produced by Hitachi High-Tech Science Corporation) was used. A storage modulus E', a loss modulus E", and tan 8 were measured in accordance with JIS K7244:1998, in a nitrogen air flow (300 mL/min), at a measurement temperature of from room temperature to 300° C., a heating rate of 4.0° C./min, a frequency of 1 Hz, and a bending mode as the measurement mode, and the peak top temperature (° C.) on the high temperature side of tan δ is shown in Table 7 as Tg.

<Film Tensile Strength, Tensile Modulus, Maximum Point Elongation Rate, and Fracture Point Elongation Rate>

Films produced using the thermoplastic resin compositions having the compositional makeup shown in Table 8 by the method described later were cut to a width of 10 mm and used for measurement.

Using a tensile tester (Strograph VG-1E, produced by Toyo Seiki Co., Ltd.), a tensile test was performed at a temperature of 23° C., a distance between grips of 50 mm, and a test speed of 50 mm/min in accordance with JIS K7161-1: 2014 and K7161-2: 2014, and the tensile strength, tensile modulus, maximum point elongation rate, and fracture point elongation rate were measured.

Production Example 1 (Production of Polyimide Resin Particle 1)

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl) cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy) ethanol with a 500 mL beaker, thereby preparing a mixed diamine solution. This mixed diamine solution was added into the suspended solution gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.010 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin particle and dehydration associated with imidization were confirmed at a solution temperature of from 120 to 140° C. The solution was kept at 190° C. for 30 minutes, then allowed to cool to room temperature, and filtered. The obtained polyimide resin particle was washed with 300 g of 2-(2-methoxyethoxy) ethanol and 300 g of methanol, filtered, and then dried at 180° C. for 10 hours with a drier, thereby providing 317 g of polyimide resin particle 1.

The measurement of the IR spectrum of polyimide resin particle 1 showed the characteristic absorption of an imide ring ν(C═O) observed at 1768 and 1697 ($cm^{-1}$). The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

Table 1 shows the compositional makeup of the polyimide resin particle 1 obtained in Production Example 1. The mole % of the tetracarboxylic acid component and the diamine component in Table 1 are values calculated from the charged amount of each component at the time of polyimide resin particle production.

In addition, the D50 of the polyimide resin particle 1 was 17 μm and the specific gravity was 1.19, and the particle was porous. The analysis results of true density, specific surface area, total pore volume, and average pore diameter of the polyimide resin particle 1 are also shown in Table 1.

Production Example 2 (Production of Polyimide Resin Particle 2)

A polyimide resin particle 2 was produced and analysis was performed by the same method as in Example 1, except that n-octylamine, which is an end capping agent, was not used. The compositional makeup and analysis results of the polyimide resin particle 2 are shown in Table 1.

TABLE 1

| | | Tetracarboxylic acid component (mol % in total tetracarboxylic acid component) | Diamine component (mol% in total diamine component) | | (1)/{(1)+(2)} | End capping agent (mole)*2 | Tm | Tg | Tc | Exothermic amount of crystallization ΔHm |
|---|---|---|---|---|---|---|---|---|---|---|
| | | PMDA | 1,3-BAC | OMDA | (mol %)*1 | n-OcA | ° C. | ° C. | ° C. | mJ/mg |
| Production Example 1 | Polyimide resin particle 1 | 100 | 35 | 65 | 35 | 0.010 | 323 | 184 | 266 | 21.0 |
| Production Example 2 | Polyimide resin particle 2 | 100 | 35 | 65 | 35 | 0 | 323 | 185 | 263 | 26.3 |

| | | Half crystallization time seconds | Mw — | D50 mm | True density (gas phase method) $g/cm^3$ | True density (liquid phase method) $g/cm^3$ | Specific surface area $m^2/g$ | Total pore volume cc/g | Average pore diameter nm |
|---|---|---|---|---|---|---|---|---|---|
| Production Example 1 | Polyimide resin particle 1 | <20 | 55,000 | 17 | 1.31 | 1.19 | 9.6 | 0.056 | 23.6 |
| Production Example 2 | Polyimide resin particle 2 | — | 72,000 | 27 | — | — | — | — | — |

*1Content ratio (mol %) of repeating structural unit of formula (1) with respect to total of repeating structural unit of formula (1) and repeating structural unit of formula (2) in polyimide resin particle
*2Molar amount with respect to 1 mole of tetracarboxylic acid component
*3: "—" means not measured The abbreviations in the table 1 are as follows.
PMDA; pyromellitic dianhydride
1,3-BAC; 1,3-bis(aminomethyl)cyclohexane
OMDA; 1,8-octamethylenediamine
n-OcA; n-octylamine Production Example 3 (Production of Modified Polyethylene Terephthalate Resin 1)

A mixture obtained by adding 6449.5 g (33.2 mol) of dimethyl terephthalate (DMT), 2747.1 g (44.2 mol) of ethylene glycol (EG), 4727.4 g (15.5 mol) of 3,9-bis(1,1-dimethyl-2-hydroxyethyl)2,4,8,10-tetraoxaspiro[5,5]undecane (SPG), and 0.03 moles of manganese acetate tetrahydrate with respect to 100 moles of dimethyl terephthalate was heated to 200° C. in a nitrogen atmosphere to carry out a transesterification reaction. After the distillation amount of methanol reached 90% or more with respect to the stoichiometric amount, 0.02 moles of antimony(III) oxide with respect to 100 moles of the dimethyl terephthalate and 0.05 moles of 100 moles of tripenylphosphate with respect to 100 moles of dimethyl terephthalate were added, the temperature was gradually increased and the pressure was gradually reduced, and polymerization was finally carried out at 280° C., and 0.1 kPa or less. The reaction was ended when an appropriate melt viscosity was reached, whereby a polyester containing, of the diol components, 44 mol % of the SPG residues, 56% of the EG residues, and 100 mol % of the dicarboxylic acid component was prepared.

Example 1 (Production and Evaluation of Thermoplastic Resin Composition and Resin Molded Article)

Polyimide resin particle 1 obtained in Production Example 1 and pellets of polypropylene (PP) resin ("Novatec FY6", produced by Japan Polypropylene Corporation, melting point 150 to 160° C., glass transition temperature 0° C.), which is the crystalline thermoplastic resin (B2-1), were used in the ratio shown in Table 2. The PP resin pellets were introduced from a hopper on the inlet side of a co-rotating twin-screw kneading extruder ("HK-25D", produced by Parker Corporation, screw diameter D=25 mm, L/D=41 (L: screw length)), and the polyimide resin particle 1 were introduced from a side feeder into the extruder. Kneading was carried out at a cylinder set temperature of 200° C., a feed rate of 6 kg/h, and a screw rotation speed of 200 rpm, and a strand was extruded. At this time, the resin temperature, torque, resin pressure, and strand state were confirmed. The resin temperature was the temperature at the outlet of the extruder.

The strand extruded from the extruder was cooled with water, and then pelletized with a pelletizer ("Fan Cutter FC-Mini-4/N", produced by Hoshi Plastic Co., Ltd.), and used for injection-molding.

The injection-molding was performed at a cylinder set temperature of 200° C., a mold temperature of 50° C., and an injection speed of 62.5 mm/s with an injection-molding machine ("ROBOSHOT α-S30iA", produced by FANUC Corporation), thereby preparing a resin molded article having a desired shape to be used in the various evaluations.

Various evaluations were performed by the methods described above using the obtained pellets and resin molded article. The results are shown in Table 2.

Examples 2 and 3 and Comparative Example 1

Pellets and resin molded articles were produced by the same method as in Example 1, except that the compositional makeup of the resin composition, and the strand injection conditions and molding conditions were changed as shown in Table 2. Various evaluations were performed by the methods described above. The results are shown in Table 2.

TABLE 2

| | | | Example | | | Comparative Example |
|---|---|---|---|---|---|---|
| | | | 1 | 2 | 3 | 1 |
| Resin compositional makeup (parts by mass) | (A1) Polyimide resin particle 1 | | 30 | 50 | 70 | 0 |
| | (B2-1) Polypropylene resin | | 70 | 50 | 30 | 100 |
| Strand extrusion | Cylinder set temperature | ° C. | 200 | 200 | 200 | — |
| | Resin temperature | ° C. | 230 | 240 | 265 | — |
| | Torque | % | 58-63 | 58-63 | 88-95 | — |
| | Resin pressure | MPa | 1.3-1.6 | 1.9-2.0 | 62-6.7 | — |
| | Cooling condition | — | water cooling | water cooling | air cooling | — |
| | Strand state | — | A | A | B | — |
| Extrusion molding condition | Cylinder set temperature | ° C. | 200 | 200 | 220 | 200 |
| | Mold temperature | ° C. | 50 | 50 | 80 | 50 |
| Resin molded article evaluation results | Specific gravity | $g/cm^3$ | 0.989 | 1.064 | 1.124 | 0.904 |
| | Specific gravity of component (A) in resin molded article | $g/cm^3$ | 1.19 | 1.22 | 1.22 | — |
| | Tensile modulus | GPa | 1.9 | 2.1 | 1.7 | 1.7 |
| | Flexural modulus | GPa | 1.77 | 1.88 | 1.83 | 1.62 |
| | HDT (1.80 MPa) | ° C. | 69.4 | 79.5 | 105.3 | 60.8 |
| | 1% Weight loss temperature | ° C. | 405.5 | 417.5 | 416.1 | 394.2 |
| | Dynamic friction coefficient | — | 0.40 | — | — | 0.62 |

"—" means not measured

From Table 2, the following can be understood.

The resin molded articles of Examples 1 to 3 containing the polyimide resin particle 1, which is the component (A), and a PP resin, which is the crystalline thermoplastic resin (B2-1), had a better tensile modulus, flexural modulus, HDT, and 1% weight loss temperature compared to the resin molded article of Comparative Example 1, which consisted only of PP resin.

In the resin molded articles of Examples 1 to 3, the specific gravity of the component (A) in the molded article was from 1.19 to 1.22. These specific gravities show values that are lower than the specific gravity of the pellets obtained by melt-kneading the polyimide resin particle 1 (1.29) and the same or slightly higher than specific gravity of the polyimide resin particle 1 blended in the resin composition (1.19). From this, it is considered that the component (A) did not melt in the production process of the resin composition and resin molded article of Examples 1 to 3, and is contained in the resin composition and the resin molded article in a state in which the shape of the polyimide resin particle 1 used was maintained.

The resin composition (pellets) obtained in Example 1 were cut using a microtome ("ULTRACUT E" produced by REICHERT-JUNG LIMITED), smoothed, and then dyed with a ruthenium-based dyeing agent. The cutting surface was observed at an acceleration voltage of 1.00 kV and an observation magnification of 100 times using a field-emission scanning electron microscope (ZEISS "GeminiSEM500") (FIG. 1). From FIG. 1, it can be seen that in the resin composition obtained in Example 1, the polyimide resin particle 1 is dispersed in a matrix composed of PP resin.

Further, strand extrudability in the production of the resin composition (pellets) of Examples 1 to 3 was confirmed. As shown in Table 2, all of the resin compositions of Examples 1 to 3 were capable of extruding a strand, but in Examples 3, an increase in resin temperature, torque, and resin pressure was observed as compared with Examples 1 and 2, and the resulting strands were also brittle. Therefore, it can be said that the resin compositions of Examples 1 and 2 had better strand extrudability.

Example 4 (Production and Evaluation of Thermoplastic Resin Composition and Resin Molded Article)

Polyimide resin particle 1 obtained in Production Example 1 and a polycarbonate (PC) resin ("Iupilon S2000", produced by Mitsubishi Engineering Plastics Corporation, glass transition temperature 145 to 150° C.), which is the amorphous thermoplastic resin (B1-1), were used in the ratio shown in Table 3. The PC resin was dried for 5 hours in a 120° C. dryer, then introduced from a hopper on the inlet side of a co-rotating twin-screw kneading extruder ("HK-25D", produced by Parker Corporation), and the polyimide resin particle 1 were introduced from a side feeder into the extruder. Kneading was carried out at a cylinder set temperature of 275° C., a feed rate of 6 kg/h, and a screw rotation speed of 150 rpm, and a strand was extruded.

The strand extruded from the extruder was cooled in air, and then pelletized with a pelletizer ("Fan Cutter FC-Mini-4/N", produced by Hoshi Plastic Co., Ltd.), and used for injection-molding.

The obtained pellets were dried for 4 hours in a 120° C. dryer, then injection-molding was performed at a cylinder set temperature of 270° C., a mold temperature of 100° C., and an injection speed of 62.5 mm/s with an injection-molding machine ("ROBOSHOT α-S30iA", produced by FANUC Corporation), thereby preparing a resin molded article having a desired shape to be used in the various evaluations.

HDT measurement was performed by the method described above using the obtained pellets and resin molded article. The results are shown in Table 3.

Comparative Example 2

A polycarbonate resin, which is the amorphous thermoplastic resin (B1-1), was dried by itself for 4 hours in a 120° C. dryer, and then a resin molded article was produced by the same method as in Example 4.

HDT measurement was performed by the method described above using the obtained resin molded article. The results are shown in Table 3.

Example 5 (Production and Evaluation of Thermoplastic Resin Composition and Resin Molded Article)

Polyimide resin particle 1 obtained in Production Example 1 and a polyphenylene sulfide (PPS) resin ("Torelina A900", produced by Toray Industries, melting point 278° C., glass transition temperature 90° C.), which is the crystalline thermoplastic resin (B2-2), were used in the ratio shown in Table 3. The PPS resin was introduced from a hopper on the inlet side of a co-rotating twin-screw kneading extruder ("HK-25D", produced by Parker Corporation), and the polyimide resin particle 1 were introduced from a side feeder into the extruder. Kneading was carried out at a cylinder set temperature of 290° C., a feed rate of 6 kg/h, and a screw rotation speed of 200 rpm, and a strand was extruded.

The strand extruded from the extruder was cooled with water, and then pelletized with a pelletizer ("Fan Cutter FC-Mini-4/N", produced by Hoshi Plastic Co., Ltd.), and used for injection-molding.

The obtained pellets were dried for 3 hours in a 130° C. dryer, then injection-molding was performed at a cylinder set temperature of 310° C., a mold temperature of 150° C., and an injection speed of 62.5 mm/s with an injection-molding machine ("ROBOSHOT α-S30iA", produced by FANUC Corporation), thereby preparing a resin molded article having a desired shape to be used in the various evaluations.

HDT measurement was performed by the method described above using the obtained resin molded article. The results are shown in Table 3.

Comparative Example 3

The PPS resin, which is the crystalline thermoplastic resin (B2-2), was dried by itself for 3 hours in a 130° C. dryer, and then a resin molded article was produced by the same method as in Example 5.

HDT measurement was performed by the method described above using the obtained resin molded article. The results are shown in Table 3.

TABLE 3

| | | | Example 4 | Comparative Example 2 | Example 5 | Comparative Example 3 |
|---|---|---|---|---|---|---|
| Resin compositional makeup (parts by mass) | (A1) Polyimide resin particle 1 | | 30 | 0 | 30 | 0 |
| | (B1-1) Polycarbonate resin | | 70 | 100 | 0 | 0 |
| | (B2-2) PPS resin | | 0 | 0 | 70 | 100 |
| Strand extrusion | Cylinder set temperature | ° C. | 275 | — | 290 | — |
| | Resin temperature | ° C. | 301 | — | 318 | — |
| | Cooling condition | — | air cooling | — | water cooling | — |
| Extrusion molding condition | Drying condition | — | 120°C 4 h | 120° C. 4 h | 130° C. 3 h | 130° C. 3 h |
| | Cylinder set temperature | ° C. | 270 | 270 | 310 | 310 |
| | Mold temperature | ° C. | 100 | 100 | 150 | 150 |
| Resin molded article evaluation results | HDT (1.80 MPa) | ° C. | 135 | 130 | 118 | 105 |

Example 6 (Production and Evaluation of Thermoplastic Resin Composition and Resin Molded Article)

Polyimide resin particle 1 obtained in Production Example 1 and a polyamide resin PA6 ("Ube Nylon 1030B", produced by Ube Industries, Inc., melting point 215 to 225° C., glass transition temperature 50° C.), which is the crystalline thermoplastic resin (B2-3), were used in the ratio shown in Table 4. The PA6 was introduced from a hopper on the base side of a co-rotating twin-screw kneading extruder ("HK-25D", produced by Parker Corporation), and the polyimide resin particle 1 were introduced from a side feeder into the extruder. Kneading was carried out at a cylinder set temperature of 260° C., a feed rate of 6 kg/h, and a screw rotation speed of 200 rpm, and a strand was extruded.

The strand extruded from the extruder was cooled with water, and then pelletized with a pelletizer ("Fan Cutter FC-Mini-4/N", produced by Hoshi Plastic Co., Ltd.), and used for injection-molding.

The obtained pellets were dried for 6 hours in an 80° C. dryer, then injection-molding was performed at a cylinder set temperature of 250° C., a mold temperature of 80° C., and an injection speed of 62.5 mm/s with an injection-molding machine ("ROBOSHOT α-S30iA", produced by FANUC Corporation). The obtained injection-molded article was subjected to an annealing treatment for 1 hour in a 120° C. dryer, thereby preparing a resin molded article having a desired shape to be used in the various evaluations.

HDT measurement and a tensile test were performed by the methods described above using the obtained resin molded article. The results are shown in Table 4.

Example 7

A resin molded article was produced by the same method as in Example 6, except that the blending amounts (parts by mass) of the polyimide resin particle 1 and the polyamide resin PA6 were changed to the amounts shown in Table 4.

HDT measurement and a tensile test were performed by the methods described above using the obtained resin molded article. The results are shown in Table 4.

Comparative Example 4

The polyamide resin PA6, which is the crystalline thermoplastic resin (B2-3), was dried by itself for 6 hours in an 80° C. dryer, and then a resin molded article was produced by the same method as in Example 6.

HDT measurement and a tensile test were performed by the methods described above using the obtained resin molded article. The results are shown in Table 4.

TABLE 4

| | | | Example 6 | Example 7 | Comparative Example 4 |
|---|---|---|---|---|---|
| Resin compositional makeup (parts by mass) | (A1) Polyimide resin particle 1 | | 30 | 40 | 0 |
| | (B2-3) Polyamide resin PA6 | | 70 | 60 | 100 |
| Strand extrusion | Cylinder set temperature | ° C. | 260 | 260 | — |
| | Resin temperature | ° C. | 291 | 316 | — |
| | Cooling condition | — | water cooling | water cooling | — |
| Extrusion molding condition | Drying condition | — | 80° C. 6 h | 80° C. 6 h | 80° C. 6 h |
| | Cylinder set temperature | ° C. | 250 | 250 | 250 |
| | Mold temperature | ° C. | 80 | 80 | 80 |
| Resin molded article evaluation results | HDT (1.80 MPa) | ° C. | 102 | 120 | 56 |
| | Tensile strength | MPa | 68 | 63 | 65 |
| | Tensile modulus | GPa | 2.5 | 2.4 | 2.5 |
| | Tensile fracture strain | % | 176 | 157 | 90 |

From Table 4, it can be seen that the resin molded articles of Examples 6 and 7 containing polyimide resin particle 1 and the polyamide resin PA6 showed an improvement in HDT and far superior tensile fracture strain than the resin molded article of Comparative Example 4 consisting only of PA6.

Example 8 (Production and Evaluation of Thermoplastic Resin Composition and Resin Molded Article)

Polyimide resin particle 1 obtained in Production Example 1 and a polyethylene terephthalate (PET) resin ("RT553C", produced by Mitsubishi Chemical Corporation, melting point 250° C., glass transition temperature 81° C.), which is the crystalline thermoplastic resin (B2-4), were used in the ratio shown in Table 5. The PET resin was introduced from a hopper on the base side of a co-rotating twin-screw kneading extruder ("HK-25D", produced by Parker Corporation), and the polyimide resin particle 1 were introduced from a side feeder into the extruder. Kneading was carried out at a cylinder set temperature of 280° C., a feed rate of 6 kg/h, and a screw rotation speed of 200 rpm, and a strand was extruded.

The strand extruded from the extruder was cooled with water, and then pelletized with a pelletizer ("Fan Cutter FC-Mini-4/N", produced by Hoshi Plastic Co., Ltd.), and used for injection-molding.

The obtained pellets were dried for 6 hours in an 80° C. dryer, then injection-molding was performed at a cylinder set temperature of 250° C., a mold temperature of 80° C., and an injection speed of 62.5 mm/s with an injection-molding machine ("ROBOSHOT α-S30iA", produced by FANUC Corporation), thereby preparing a resin molded article having a desired shape to be used in the various evaluations.

Various evaluations were performed by the methods described above using the obtained resin molded article. The results are shown in Table 5.

Comparative Example 5

The PET resin, which is the crystalline thermoplastic resin (B2-4), was dried by itself for 3 hours in a 130° C. dryer, and then a resin molded article was produced by the same method as in Example 8.

Various evaluations were performed by the methods described above using the obtained resin molded article. The results are shown in Table 5.

Example 9 (Production and Evaluation of Thermoplastic Resin Composition and Resin Molded Article)

Polyimide resin particle 1 obtained in Production Example 1 and modified polyethylene terephthalate (PET) resin 1 (melting point 220 to 230° C., glass transition temperature 110° C.), which is the crystalline thermoplastic resin (B2-5) obtained in Production Example 3, were used in the ratio shown in Table 5. The PET resin was introduced from a hopper on the base side of a co-rotating twin-screw kneading extruder ("HK-25D", produced by Parker Corporation), and the polyimide resin particle 1 were introduced from a side feeder into the extruder. Kneading was carried out at a cylinder set temperature of 265° C., a feed rate of 6 kg/h, and a screw rotation speed of 200 rpm, and a strand was extruded.

The strand extruded from the extruder was cooled with water, and then pelletized with a pelletizer ("Fan Cutter FC-Mini-4/N", produced by Hoshi Plastic Co., Ltd.), and used for injection-molding.

The obtained pellets were dried for 6 hours in an 80° C. dryer, then injection-molding was performed at a cylinder set temperature of 250° C., a mold temperature of 80° C., and an injection speed of 62.5 mm/s with an injection-molding machine ("ROBOSHOT α-S30iA", produced by FANUC Corporation), thereby preparing a resin molded article having a desired shape to be used in the various evaluations.

Various evaluations were performed by the methods described above using the obtained resin molded article. The results are shown in Table 5.

Comparative Example 6

The PET resin, which is the crystalline thermoplastic resin (B2-5), was dried by itself for 3 hours in a 130° C. dryer, and then a resin molded article was produced by the same method as in Example 9.

Various evaluations were performed by the methods described above using the obtained resin molded article. The results are shown in Table 5.

TABLE 5

| | | | Example 8 | Comparative Example 5 | Example 9 | Comparative Example 6 |
|---|---|---|---|---|---|---|
| Resin compositional makeup (parts by mass) | (A1) Polyimide resin particle 1 | | 30 | 0 | 30 | 0 |
| | (B2-4) PET resin RT553C | | 70 | 100 | 0 | 0 |
| | (B2-5) Modified PET resin 1 | | 0 | 0 | 70 | 100 |
| Resin molded article evaluation results | HDT (1.80 MPa) | ° C. | 70 | 65 | 90 | 85 |
| | Bending strength | MPa | 97.6 | 81.6 | 92.5 | 90.8 |
| | Flexural modulus | GPa | 2.6 | 2.3 | 2.5 | 2.4 |
| | Tensile strength | MPa | 62 | 64 | 55 | 57 |
| | Tensile modulus | GPa | 2.5 | 2.3 | 2.4 | 2.5 |

From Table 5, it can be seen that the resin molded article articles of Examples 8 and 9 containing polyimide resin particle 1 and a PET resin or modified PET resin 1 showed an improvement in HDT, bending strength, and flexural modulus compared to the resin molded articles of Comparative Examples 5 and 6 consisting only of a PET resin or modified PET resin 1.

Example 10 (Production and Evaluation of Thermoplastic Resin Composition and Resin Molded Article)

Using the two-component curable epoxy resin composition (C-1) as the thermosetting resin (C), a thermosetting resin composition and a cured product were prepared and evaluated by the following method.

18.6 g of a bisphenol type A liquid epoxy resin (jER828, produced by Mitsubishi Chemical Corporation, epoxy equivalent 186 g/equivalent), which is a main agent epoxy group-containing compound heated to 40° C. was added to a 100 cc disposable cup. 9.5 g of the polyimide resin particle 1 obtained in Production Example 1 were added thereto, and then 3.55 g of the curing agent 1,3-bis(aminomethyl)cyclohexane ("1,3-BAC", produced by Mitsubishi Gas Chemical Co., Ltd.) was added. The resultant mixture was mixed for 1 minute using a wooded spatula at a rotational speed of 200 rpm/min to prepare a thermosetting resin composition containing the polyimide resin particle 1 and the two-component curable epoxy resin composition (C-1) consisting of the main agent and a curing agent. In the two-component curable epoxy resin composition (C-1), the molar ratio between the number of epoxy groups in the main agent and the number of active amine hydrogens in the curing agent was 1/1.

The obtained thermosetting resin composition was held in a hot air dryer at 80° C. for 1 hour to cure, and then 5% weight loss temperature and the 10% weight loss temperature of the cured product were measured by the method described above. The results are shown in Table 6.

Example 11

A thermosetting resin composition and a cured product thereof were produced by the same method as in Example 10, except that the addition amount of the polyimide resin particle 1 was changed to 22.1 g, and the 5% weight loss temperature and 10% weight loss temperature of the cured product were measured by the method described above. The results are shown in Table 6.

TABLE 6

| | | | Example | |
|---|---|---|---|---|
| | | | 10 | 11 |
| Resin compositional makeup (parts by mass) | (A1) Polyimide resin particle 1 | | 30 | 50 |
| | (C-1) Two-component curable epoxy resin composition | | 70 | 50 |
| Curing condition | Curing temperature | ° C. | 80 | 80 |
| | Curing time | h | 1 | 1 |

TABLE 6-continued

| | | | Example | |
|---|---|---|---|---|
| | | | 10 | 11 |
| Resin molded article evaluation results | 5% Weight loss temperature | ° C. | 340 | 347 |
| | 10% Weight loss temperature | ° C. | 351 | 358 |

Example 12 (Production and Evaluation of Thermosetting Resin Composition and Resin Molded Article)

A thermosetting resin composition and cured product were produced and evaluated by the following method using a two-component curable epoxy resin composition (C-2) as the thermosetting resin (C).

Tetraglycidyl diaminodiphenylmethane (TGDDM) ("Sumiepoxy ELM-434", produced by Sumitomo Chemical Co., Ltd.), which is an epoxy group-containing compound of the main agent, was weighed into a 500 mL separable flask and heated to 130° C. in an oil bath to melt. Next, the amount shown in Table 1 of the polyimide resin particle 1 dried in advance at 150° C. for 1 hour was added and stirred for 3 hours while continuing heating. After the stirring, the mixture was cooled to 110° C., transferred to a disposable cup, and weighed. Here, the epoxy resin composition was prepared by adding 4,4'-diamodiphenylsulfone (DDS) as a curing agent in an equivalent ratio of the number of active amine hydrogens in the curing agent and the number of epoxy groups in the main agent (number of active amine hydrogens in the curing agent/number of epoxy groups in the main agent)=1/1.43, and stirring and mixing at 110° C. in an oven.

The obtained epoxy resin composition was defoamed under reduced pressure, the epoxy resin composition was poured into casting molds having a predetermined shape that had been heated to 110° C. in advance, the temperature was increased to 150° C. at a heating rate of 2° C./min, heated for 2 hours, the temperature was then increased to 180° C., and further heated for 2 hours to cure, to thereby obtain test pieces in the desired shape.

The test piece dimensions were as follows.

For bending fracture toughness test: 125 mm×115 mm×6 mm

For measurement of dynamic viscoelasticity and Poisson's ratio: 220 mm×100 mm×3 mm Using the obtained test pieces, the plane strain fracture toughness ($K_{1C}$), strain energy release rate ($G_{1c}$), Poisson's ratio, and glass transition temperature by DMA were measured by the methods described above. The results are shown in Table 7.

Examples 13 to 15 and Comparative Examples 7 to 9

Epoxy resin compositions and cured products thereof were produced and evaluated by the same method as in Example 12, except that the type, amount, and drying conditions of the resin particle used were changed to as shown in Table 7. The results are shown in Table 7.

TABLE 7

| | | | Example | | | | Comparative Example | | |
|---|---|---|---|---|---|---|---|---|---|
| | | | 12 | 13 | 14 | 15 | 7 | 8 | 9 |
| Resin compositional makeup (parts by mass) | (A1) Polyimide resin particle 1 | | 5 | 10 | 15 | 0 | 0 | 0 | 0 |
| | (A2) Polyimide resin particle 2 | | 0 | 0 | 0 | 10 | 0 | 0 | 0 |
| | (a1) Polyether sulfone resin particle | | 0 | 0 | 0 | 0 | 0 | 10 | 0 |
| | (a2) Polyetheretherketone resin particle | | 0 | 0 | 0 | 0 | 0 | 0 | 10 |
| | (C-2) Two-component curable epoxy resin composition | | 95 | 90 | 85 | 90 | 100 | 90 | 90 |
| Particle drying condition | | ° C., time | 150° C. 1 h | | | | — | 160° C. 1 h | 150° C. 2 h |
| Resin molded article evaluation results | Plane strain fracture toughness $K_{1C}$ | MPa · $m^{0.5}$ | 0.49 | 0.52 | 0.55 | 0.68 | 0.46 | 0.45 | 0.40 |
| | Strain energy release rate $G_{1c}$ | J/$m^2$ | 57 | 63 | 75 | 112 | 50 | — | — |
| | Poisson's ratio | — | 0.38 | 0.38 | 0.36 | 0.37 | 0.38 | — | — |
| | Glass transition temperature | ° C. | 267 | 266 | 268 | 267 | 267 | 266 | 267 |

*: "—" means not measured

The components listed in Table 7 are as follows.

(A1) Polyimide resin particle 1: Polyimide resin particle obtained in Production Example 1

(A2) Polyimide resin particle 2: Polyimide resin particle obtained in Production Example 2 (ends not sealed)

(a1) Polyethersulfone resin particle: Sumika Excel 4800P produced by Sumitomo Chemical Co., Ltd., D50=560 μm (a2) Polyetheretherketone resin particle: "330UPF" produced by Jilin Joinature Polymer Co., Ltd, D50=14 μm (C-2) Two-component curable epoxy resin composition: Epoxy resin composition obtained by mixing 4,4'-diamodiphenylsulfone (DDS) as a curing agent with tetraglycidyl diaminodiphenylmethane (TGDDM), which is an epoxy group-containing compound of the main agent, in an equivalent ratio of the number of active amine hydrogens in the curing agent and the number of epoxy groups in the main agent (number of active amine hydrogens in the curing agent/number of epoxy groups in the main agent)=1/1.43.

From Table 7, it can be seen that the cured product of the thermosetting resin compositions of Examples 12 to 15 could have better plane strain fracture toughness and strain energy release rate than the cured products of the comparative examples while maintaining heat resistance. Further, by using the polyimide resin particle 2, which has uncapped ends, as the polyimide resin particle, the plane strain fracture toughness and the strain energy release rate are further improved.

Reference Examples 1 and 2 (Production of Thermoplastic Resin Films)

Polyimide resin particle 1 obtained in Production Example 1 and pellets of polypropylene (PP) resin ("Novatec FY6", produced by Japan Polypropylene Corporation), which is the crystalline thermoplastic resin (B2-1), were used in the ratio shown in Table 8. The PP resin was used after being dried for 6 hours or more in hot air at 80° C. in advance.

The PP resin pellets were introduced from a hopper on the inlet side of a co-rotating twin-screw kneading extruder ("HK-25D", produced by Parker Corporation, screw diameter D=25 mm, L/D=41 (L: screw length)), and the polyimide resin particle 1 were introduced from a side feeder into the extruder. Kneading was carried out at a cylinder set temperature of 200° C., a feed rate of 6 kg/h, and a screw rotation speed of 200 rpm, and a strand was extruded. The strand extruded from the extruder was cooled with water, and then pelletized with a pelletizer ("Fan Cutter FC-Mini-4/N", produced by Hoshi Plastic Co., Ltd.), thereby producing a single-layer film by extrusion molding using the pellets.

The extrusion molding was carried out under the following conditions using a Labo Plasto Mill including an extruder, a T-die, a cooling roll, and a drawing machine.

Extruder
- Screw diameter D: 20 mm, L/D=25 (L: screw length)
- Screw rotation speed: 14 rpm
- Set temperature: 190 to 210° C.

T-Die
- Die width: 150 mm, Lip width: 0.4 mm
- Set temperature: 205° C.

Cooling Roll
- Set temperature: 50° C.

Drawing Machine
- Drawing speed: 1.0 m/min

Using the obtained films, films were evaluated by the methods described above. The results are shown in Table 8.

Reference Examples 3 to 7 (Production of Thermoplastic Resin Films)

Polyimide resin particle 1 obtained in Production Example 1 and the polyamide resin PA6 ("Ube Nylon 1030B", produced by Ube Industries, Inc.), which is the crystalline thermoplastic resin (B2-3), were used in the ratio shown in Table 8. The PA6 resin was used after being preliminarily dried for 10 hours or more at 80° C. in advance.

The PA6 resin was introduced from a hopper on the base side of a co-rotating twin-screw kneading extruder ("HK-25D", produced by Parker Corporation), and the polyimide resin particle 1 were introduced from a side feeder into the extruder. Kneading was carried out at a cylinder set temperature of 260° C., a feed rate of 6 kg/h, and a screw rotation speed of 200 rpm, and a strand was extruded. The strand extruded from the extruder was cooled with water, and then pelletized with a pelletizer ("Fan Cutter FC-Mini-4/N", produced by Hoshi Plastic Co., Ltd.), thereby producing a single-layer film by extrusion molding using the pellets.

The extrusion molding was carried out under the following conditions using a Labo Plasto Mill including an extruder, a T-die, a cooling roll, and a drawing machine.

Extruder
- Screw diameter D: 20 mm, L/D=25
- Screw rotation speed: 16 rpm
- Set temperature: 240 to 265° C.

T-Die
- Die width: 150 mm, Lip width: 0.4 mm
- Set temperature: 260° C.

Cooling Roll
- Set temperature: 48° C.

Drawing Machine
- Drawing speed: 1.0 m/min

Using the obtained films, films were evaluated by the methods described above. The results are shown in Table 8.

Reference Examples 8 and 9 (Production of Thermoplastic Resin Films)

Polyimide resin particle 1 obtained in Production Example 1 and the polyamide resin MXD6 (poly meta-xylylene adipamide, "S6011", produced by Mitsubishi Gas Chemical Co., Ltd., melting point 237° C., glass transition temperature 85° C.), which is the crystalline thermoplastic resin (B2-6), were used in the ratio shown in Table 8. The MXD6 resin was used after being preliminarily dried for 10 hours or more at 80° C. in advance.

The MXD6 resin was introduced from a hopper on the base side of a co-rotating twin-screw kneading extruder ("HK-25D", produced by Parker Corporation), and the polyimide resin particle 1 were introduced from a side feeder into the extruder. Kneading was carried out at a cylinder set temperature of 260° C., a feed rate of 6 kg/h, and a screw rotation speed of 200 rpm, and a strand was extruded. The strand extruded from the extruder was cooled with water, and then pelletized with a pelletizer ("Fan Cutter FC-Mini-4/N", produced by Hoshi Plastic Co., Ltd.), thereby producing a single-layer film by extrusion molding using the pellets.

The extrusion molding was carried out under the following conditions using a Labo Plasto Mill including an extruder, a T-die, a cooling roll, and a drawing machine.

Extruder
- Screw diameter D: 20 mm, L/D=25
- Screw rotation speed: 40 rpm
- Set temperature: 240 to 260° C.

T-Die
- Die width: 150 mm, Lip width: 0.4 mm
- Set temperature: 260° C.

Cooling Roll
- Set temperature: 75° C.

Drawing Machine
- Drawing speed: 1.8 m/min (Reference Example 8), 1.2 m/min (Reference Example 9)

Using the obtained films, films were evaluated by the methods described above. The results are shown in Table 8.

TABLE 8

| | | | Reference Example | | | | | | | | |
|---|---|---|---|---|---|---|---|---|---|---|---|
| | | | 1 | 2 | 3 | 4 | 5 | 6 | 7 | 8 | 9 |
| Resin compositional makeup (parts by mass) | (A1) Polyimide resin particle 1 | | 1 | 10 | 1 | 5 | 10 | 30 | 50 | 10 | 30 |
| | (B2-1) Polypropylene resin | | 99 | 90 | — | — | — | — | — | — | — |
| | (B2-3) Polyamide resin PA6 | | — | — | 99 | 95 | 90 | 70 | 50 | — | — |
| | (B2-6) Polyamide resin MXD6 | | — | — | — | — | — | — | — | 90 | 70 |
| Film evaluation results | Average thickness | μm | 50 | 50 | 50 | 50 | 50 | 50 | 50 | 50 | 50 |
| | Tensile strength | MPa | 27 | 20 | 44 | 34 | 26 | 41 | 50 | 55 | 27 |
| | Tensile modulus | GPa | 0.75 | 0.75 | 0.57 | 0.67 | 0.61 | 0.76 | 1.03 | 2.1 | 1.4 |
| | Maximum point elongation rate | % | 495 | 420 | 283 | 232 | 54 | 203 | 206 | 3 | 2 |
| | Fracture point elongation rate | % | 502 | 427 | 289 | 243 | 138 | 209 | 211 | 3 | 2 |

The components listed in Table 8 are as follows.

(A1) Polyimide resin particle 1: Polyimide resin particle obtained in Production Example 1

(B2-1) Polypropylene resin: "Novatec FY6", produced by Japan Polypropylene Corporation (B2-3) Polyamide resin PA6: "Ube Nylon 1030B", produced by Ube Industries, Inc.

(B2-6) Polyamide resin MXD6: Poly meta-xylylene adipamide, "S6011", produced by Mitsubishi Gas Chemical Co., Ltd.

INDUSTRIAL APPLICABILITY

According to the present invention, for a thermoplastic resin such as a crystalline thermoplastic resin having a low melting point or an amorphous thermoplastic resin having a low glass transition temperature, or a thermosetting resin, a resin composition, a resin molded article, and a method for producing the same, having various improved properties, such as heat resistance and mechanical properties, while maintaining a lightness derived from the resin, can be provided.

The invention claimed is:

1. A resin composition, comprising:

a polyimide resin particle (A); and at least one selected from the group consisting of a thermoplastic resin (B) other than the polyimide resin particles (A) and a thermosetting resin (C), wherein the polyimide resin particle (A) comprises a repeating structural unit of formula (1) and a repeating structural unit of formula (2), (1)

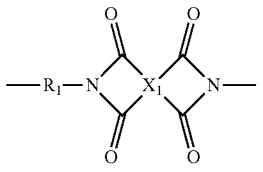

(2)

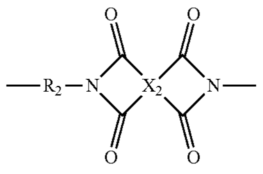

wherein $R_1$ represents a divalent group having from 6 to 22 carbon atoms and comprising an alicyclic hydrocarbon structure, $R_2$ represents a divalent chain aliphatic group having from 5 to 16 carbon atoms, $X_1$ and $X_2$ each independently represent a tetravalent group having from 6 to 22 carbon atoms and comprising an aromatic ring, a content ratio of the repeating structural unit of the formula (1) with respect to a total of the repeating structural unit of the formula (1) and the repeating structural unit of the formula (2) is 20 to 70 mol %, and the polyimide resin particle (A) has a volume average particle size D50 of 5 to 200 μm, and the thermoplastic resin (B) is at least one selected from the group consisting of the following (B1) and (B2):

(B1) an amorphous thermoplastic resin having a glass transition temperature that is lower than a melting point of the polyimide resin particle (A); and (B2) a crystalline thermoplastic resin having a melting point that is lower than the melting point of the polyimide resin particle (A).

2. The resin composition according to claim 1, wherein the polyimide resin particle (A) is porous, and has an average pore diameter of from 5 to 85 nm.

3. The resin composition according to claim 2, wherein the thermosetting plastic resin (C) is at least one selected from the group consisting of an epoxy resin, a phenol resin, a urea resin, a melamine resin, an unsaturated polyimide resin, a bismaleimide resin, a silicone resin, a urethane resin, a casein resin, a furan resin, an alkyd resin, and a xylene resin.

4. The resin composition according to claim 2, wherein the polyimide resin particle (A) comprises a polyimide resin having uncapped ends.

5. The resin composition according to claim 1, wherein a mass ratio of the polyimide resin particle (A) to a total amount of the thermoplastic resin (B) and thermosetting resin (C), [(A)/{(B)+(C)}], is in a range of 1/99 to 99/1.

6. The resin composition according to claim 5, wherein the thermosetting plastic resin (C) is at least one selected from the group consisting of an epoxy resin, a phenol resin, a urea resin, a melamine resin, an unsaturated polyimide resin, a bismaleimide resin, a silicone resin, a urethane resin, a casein resin, a furan resin, an alkyd resin, and a xylene resin.

7. The resin composition according to claim 5, wherein the polyimide resin particle (A) comprises a polyimide resin having uncapped ends.

8. The resin composition according to claim 1, wherein the thermoplastic resin (B) is at least one selected from the group consisting of a polystyrene resin, polyvinyl chloride, polyvinylidene chloride, polymethyl methacrylate, an acrylonitrile-butadiene-styrene resin, a polycarbonate resin, a polysulfone resin, a polyphenyl sulfone resin, a polyarylate resin, a polyphenylene ether resin, a polyether sulfone resin, a polyetherimide resin, a polyamideimide resin, a polyolefin resin, a polyamide resin, a polyacetal resin, a polyphenylene sulfide resin, a polyester resin, a liquid crystal polymer, a fluororesin, a polymethylpentene resin, and a polyurethane resin.

9. The resin composition according to claim 1, wherein the thermosetting plastic resin (C) is at least one selected from the group consisting of an epoxy resin, a phenol resin, a urea resin, a melamine resin, an unsaturated polyimide resin, a bismaleimide resin, a silicone resin, a urethane resin, a casein resin, a furan resin, an alkyd resin, and a xylene resin.

10. The resin composition according to claim 9, wherein the epoxy resin is a two-component curable epoxy resin composition comprising a main agent comprising tetraglycidyl diaminodiphenylmethane, and a curing agent comprising diaminodiphenylsulfone.

11. The resin composition according to claim 1, wherein the polyimide resin particle (A) comprises a polyimide resin having uncapped ends.

12. The resin composition according to claim 1, wherein the thermoplastic resin (B) comprises the amorphous thermoplastic resin (B1).

13. The resin composition according to claim 1, wherein the thermoplastic resin (B) comprises the crystalline thermoplastic resin (B2).

14. A resin molded article, comprising:

a polyimide resin particle (A); and at least one selected from the group consisting of a thermoplastic resin (B) other than the polyimide resin particles (A) and a cured product of a thermosetting resin (C), wherein the polyimide resin particle (A) comprises a repeating structural unit of formula (1) and a repeating structural unit of formula (2), (1)

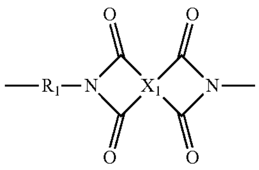

(2)

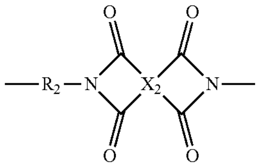

wherein $R_1$ represents a divalent group having from 6 to 22 carbon atoms and comprising an alicyclic hydrocarbon structure, $R_2$ represents a divalent chain aliphatic group having from 5 to 16 carbon atoms, $X_1$ and $X_2$ each independently represent a tetravalent group having from 6 to 22 carbon atoms and comprising an aromatic ring, a content ratio of the repeating structural unit of the formula (1) with respect to a total of the repeating structural unit of the formula (1) and the repeating structural unit of the formula (2) is 20 to 70 mol %, the polyimide resin particle (A) has a volume average particle size D50 of 5 to 200 μm, and the thermoplastic resin (B) is at least one selected from the group consisting of the following (B1) and (B2):

(B1) an amorphous thermoplastic resin having a glass transition temperature that is lower than a melting point of the polyimide resin particle (A); and (B2) a crystalline thermoplastic resin having a melting point that is lower than the melting point of the polyimide resin particle (A).

15. A method for producing the resin molded article according to claim 14, comprising:

molding a resin composition comprising the polyimide resin particle (A) and at least one selected from the group consisting of the thermoplastic resin (B) and the thermosetting resin (C) at a temperature that is lower than a melting point of the polyimide resin particle (A).

16. The method according to claim 15, wherein the thermoplastic resin (B) is the amorphous thermoplastic resin (B1), and the method further comprises:

extruding the resin composition comprising the polyimide resin particle (A) and the amorphous thermoplastic resin (B1) at a temperature that is lower than the melting point of the polyimide resin particle (A) and that is equal to or higher than the glass transition temperature of the amorphous thermoplastic resin (B1).

17. The method according to claim 15, wherein the thermoplastic resin (B) is the crystalline thermoplastic resin (B2), and the method further comprises:

extruding the resin composition comprising the polyimide resin particle (A) and the crystalline thermoplastic resin (B2) at a temperature that is lower than the melting point of the polyimide resin particle (A) and that is equal to or higher than the melting point of the crystalline thermoplastic resin (B2).

18. The resin molded article according to claim 14, wherein the thermoplastic resin (B) comprises the amorphous thermoplastic resin (B1).

19. The resin molded article according to claim 14, wherein the thermoplastic resin (B) comprises the crystalline thermoplastic resin (B2).

* * * * *